United States Patent
Okabe

(10) Patent No.: US 8,302,976 B2
(45) Date of Patent: Nov. 6, 2012

(54) WORKING MACHINE

(75) Inventor: Kaku Okabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 211 days.

(21) Appl. No.: 12/851,109

(22) Filed: Aug. 5, 2010

(65) Prior Publication Data

US 2011/0057401 A1    Mar. 10, 2011

(30) Foreign Application Priority Data

Sep. 4, 2009    (JP) ................................ 2009-204813

(51) Int. Cl.
*B62B 1/12*    (2006.01)
*H05K 5/00*    (2006.01)

(52) U.S. Cl. ........... 280/47.24; 280/37; 280/38; 280/40; 280/655; 280/655.1; 280/47.315; 322/1; 248/129; 248/133; 248/145.6

(58) Field of Classification Search .................. 280/638, 280/639, 37, 38, 40, 641, 42, 651, 652, 655, 280/655.1, 656, 659, 47.131, 47.17, 47.24, 280/47.315, 47.371; 417/234; 248/129, 248/133, 145.6; 322/1
See application file for complete search history.

(56) References Cited

U.S. PATENT DOCUMENTS

| | | | | |
|---|---|---|---|---|
| 3,778,079 A | * | 12/1973 | Vornberger et al. | ....... 280/149.2 |
| 5,368,143 A | * | 11/1994 | Pond et al. | ................... 190/18 A |
| 6,079,720 A | * | 6/2000 | Spear et al. | ............. 280/47.371 |
| 6,923,627 B1 | | 8/2005 | Wood et al. | |
| 7,163,382 B1 | * | 1/2007 | Stilwell et al. | ................ 417/234 |
| 7,246,805 B2 | * | 7/2007 | Neal et al. | ........................ 280/35 |
| 7,597,340 B2 | * | 10/2009 | Hirose et al. | ............... 280/655.1 |
| 7,896,368 B2 | * | 3/2011 | Craig et al. | ............... 280/47.24 |
| 8,123,237 B2 | * | 2/2012 | Takemura | .................... 280/47.2 |
| 2005/0196290 A1 | * | 9/2005 | Hu | ................................. 417/234 |
| 2006/0290084 A1 | * | 12/2006 | Sodemann et al. | ........ 280/47.17 |
| 2007/0176426 A1 | * | 8/2007 | Hirose et al. | .................. 290/1 A |
| 2009/0010770 A1 | * | 1/2009 | Hernandez et al. | ........... 417/234 |
| 2010/0066057 A1 | * | 3/2010 | Jian | ................................. 280/639 |

FOREIGN PATENT DOCUMENTS

| | | |
|---|---|---|
| DE | 20 2005 019979 U1 | 5/2006 |
| JP | 11-321658 A | 11/1999 |
| JP | 2005-030552 A | 2/2005 |
| JP | 4167561 B2 | 10/2008 |

OTHER PUBLICATIONS

European Search Report dated Dec. 20, 2010, issued in corresponding European Patent Application No. 10172448.2.

* cited by examiner

*Primary Examiner* — John R Olszewski
(74) *Attorney, Agent, or Firm* — Westerman, Hattori, Daniels & Adrian, LLP

(57) ABSTRACT

In a working machine, a towing handle is mounted on a top section of a machine body in such a manner that the handle is pivotable between a stored position and a deployed position, and the machine body is towable with the handle in the deployed position. The handle in the stored position extends along outer peripheral portions of the top section and a predetermined wall section of the machine, and the wall section has an upper end region that extends in a machine-towing direction to connect to the top section and has to-be-protected member provided thereon. The handle in the stored position projects outwardly beyond the top section and the wall section.

4 Claims, 18 Drawing Sheets

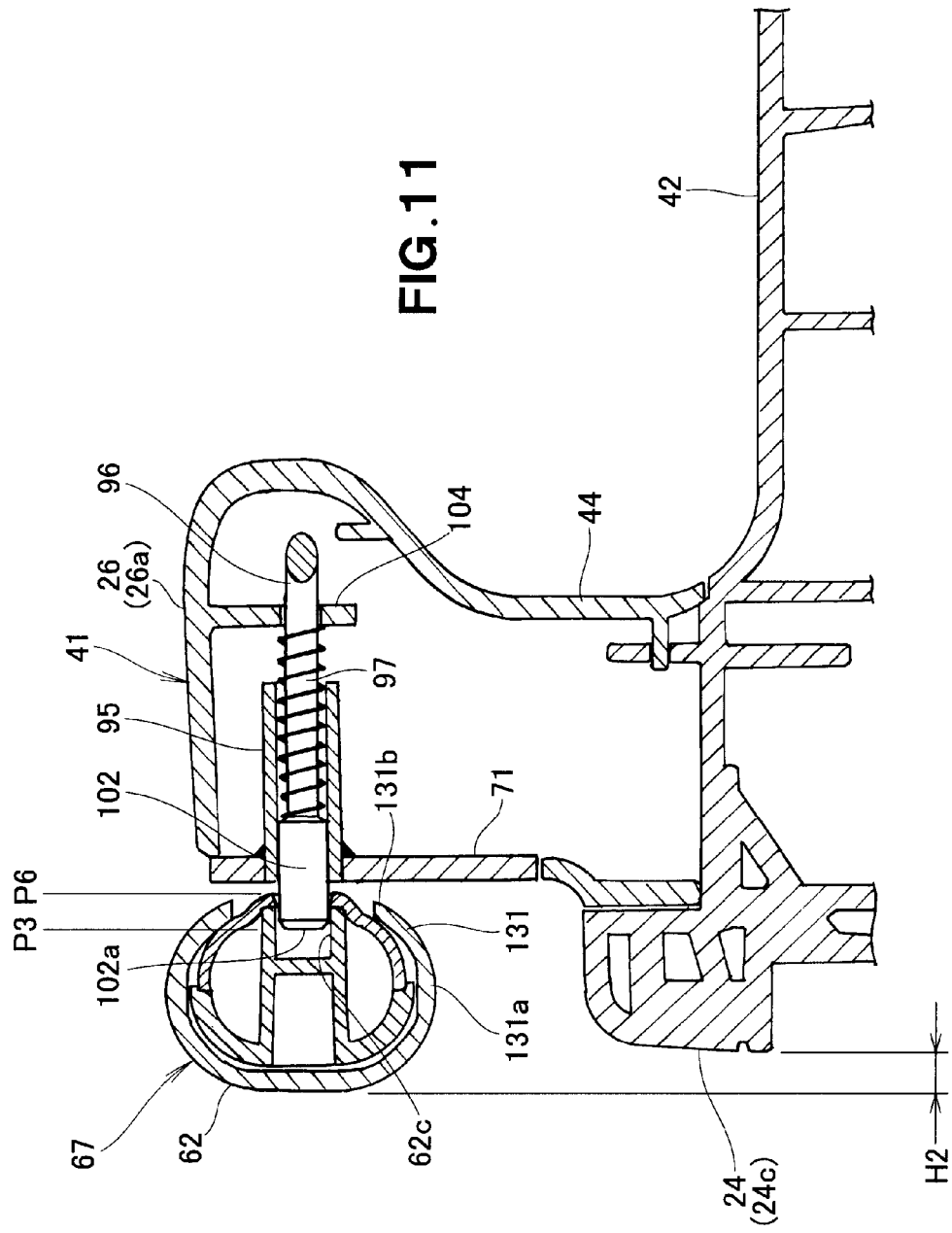

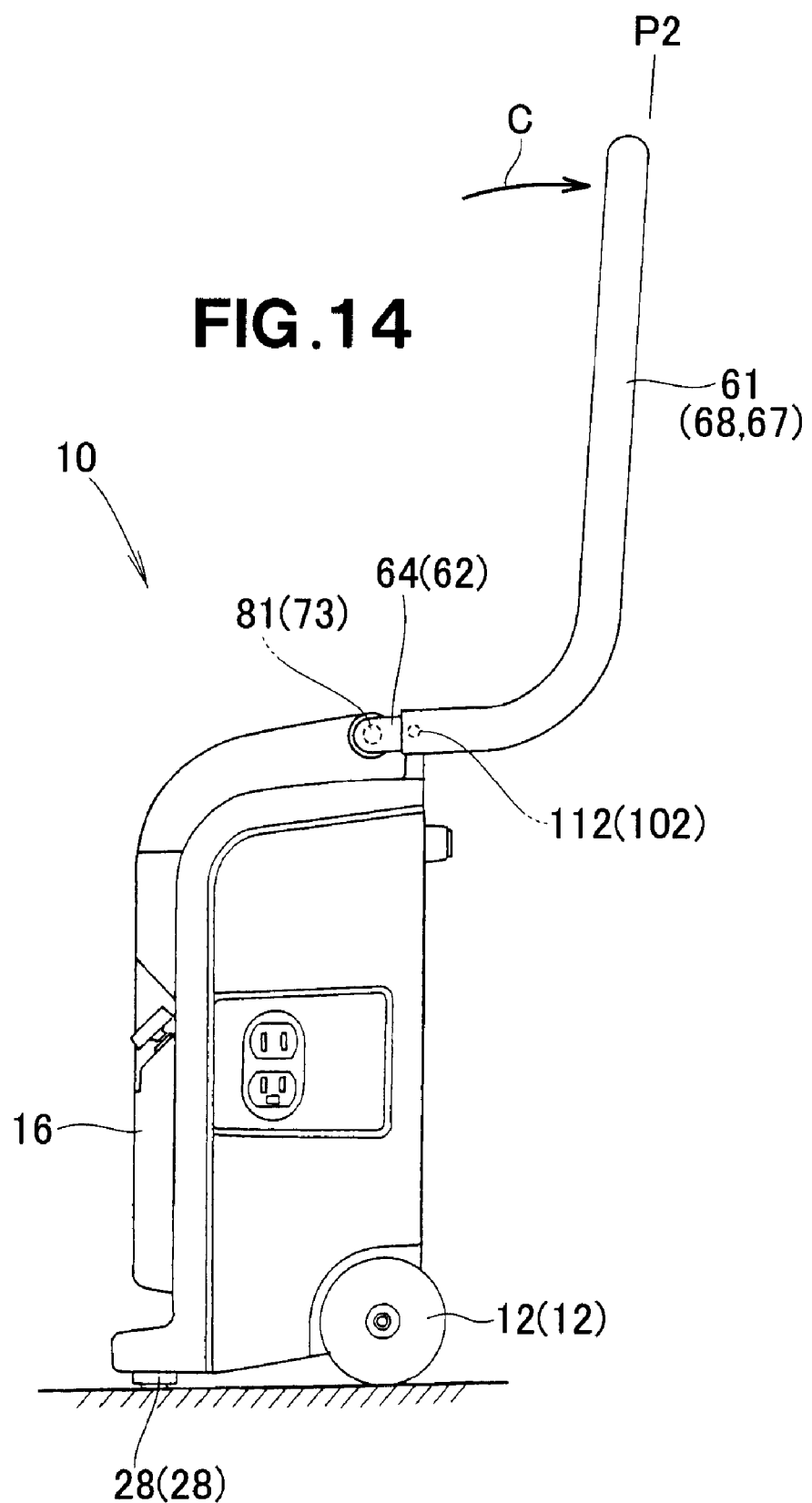

WORKING MACHINE

FIELD OF THE INVENTION

The present invention relates to working machines in which a handle pivotally mounted on the body of a working machine is movable between a stored position where the handle is stored in the machine body and a deployed position where the handle is deployed from the machine body, and in which the machine body is towable by a user or human operator using the handle retained in the deployed position.

BACKGROUND OF THE INVENTION

Among the conventionally-known working machines are ones in which the machine body has a substantially rectangular parallelepiped shape and various members, such as an electric outlet and an operation start/stop switch, that need to be protected (i.e., "to be protected members") are provided on a wall section of the machine body, and in which a towing handle structure (hereinafter referred to also as "working machine handle structure") is provided on the machine body. As known, for example, from Japanese Patent No. 4167561, the working machine handle structure includes a towing handle mounted on the machine body and pivotable between a stored position and a deployed position.

When the working machine is to be towed, the handle in the known working machine handle structure is pivotally moved or extended to the deployed position and towed by a human operator. Further, when the working machine is to be carried to a desired place in a vehicle, the handle is pivotally retracted or collapsed to the stored position and then lifted up to a loading platform of the vehicle. Namely, the working machine disclosed in the U.S. Pat. No. 4,167,561 has portability such that it can be not only moved on a road surface by towing force but also carried in a vehicle.

However, when the working machine is carried in the vehicle, it may undesirably move (positionally shift) from an initial vehicle-mounted position due to vibration and acceleration/deceleration of the vehicle during travel of the vehicle. By such positional shift of the working machine, the to-be-protected members, such as the electric outlet and an operation start/stop switch, that need to be protected might be undesirably interfered with and even damaged by other luggage loaded in the vehicle and projecting members of the vehicle.

As measures against such interference of the to-be-protected members, it is conceivable to protect the to-be-protected members with dedicated guard members or the like. In such a case, however, the number of necessary component parts would increase, which would lead to an increased weight and cost of the working machine. Thus, the working machine with the dedicated guards is not preferred as a portable working machine whose important feature is portability.

SUMMARY OF THE INVENTION

In view of the foregoing prior art problems, it is an object of the present invention to provide an improved working machine which can reliably protect to-be-protected members, such as an operation start/stop switch, without increasing the number of necessary component parts.

In order to accomplish the above-mentioned object, the present invention provides an improved working machine, which comprises: towing wheels mounted on a machine body formed in a substantially rectangular parallelepiped shape; and a towing handle mounted on a top section of the machine body in such a manner that the handle is movable between a stored position where the handle is stored in the machine body and a deployed position where the handle is deployed from the stored position, the machine body being towable with the handle in the deployed position. The handle in the stored position is disposed along outer peripheral portions of the top section and a predetermined wall section of the machine body located adjoining the top section, and the wall section has an upper end connecting with an end of the top section that extends generally in a machine-towing direction. To-be-protected members, such as a cassette gas canister and operation start/stop switch, are provided on the top section and the predetermined wall section. The handle in the stored position projects outwardly beyond the top section and the wall section.

In the present invention, the handle in the stored position projects outwardly beyond the top section and the wall section (e.g., front wall section); namely, the top section and the wall section of the machine body are located inwardly of the handle. Thus, the to-be-protected members provided on the top section and the wall section can be protected with the handle. Namely, the handle can also be used as a member for protecting the to-be-protected members, and thus, the present invention can effectively protect the to-be-protected members, provided on the top section and the wall section, without providing dedicated guard members, thereby avoiding an increase in the number of necessary component parts.

Preferably, the handle in the stored position is disposed along outer peripheral portions of opposed side wall sections (e.g., left and right side wall sections) of the machine body which are located adjoining the predetermined wall section, and the handle in the stored position projects outwardly beyond the opposed side wall sections. Thus, the opposed side wall sections of the machine body are located inwardly of the handle. Therefore, any desired to-be-protected members can be provided on the opposed side wall sections and can be effectively protected with the handle. As a result, the present invention can achieve an enhanced design freedom. Because the handle can also be used as a member for protecting the to-be-protected members provided on the opposed side wall sections, and thus, the present invention can avoid an increase in the number of necessary component parts.

Preferably, the wheels are mounted on an end portion, in the machine-towing direction, of a bottom section of the machine body, and the handle is pivotably mounted on an end portion, in the machine-towing direction, of the top section.

Preferably, the handle is formed in a substantially L shape, as viewed in side elevation, so that the handle has an intermediate corner portion. When the handle is in the deployed position, the corner portion projects generally in the machine-towing direction beyond a support shaft via which the handle is pivotably mounted on the machine body.

Thus, there can be secured a greater length between the support shaft and a handle grip than in the conventionally-known working machines where the handle is formed in a straight shape. Thus, when the handle is in the deployed position, the handle grip can be positioned at an easy-to-grip position sufficiently remote from the machine body. Therefore, usability or operability of the handle and hence the working machine can be enhanced. Further, the handle, formed in an L shape as viewed in side elevation as noted above, is retained (locked) in the deployed position during towing of the working machine.

Thus, if the working machine has toppled down as a result of the human operator accidentally taking his or her hand off the handle grip during the towing of the working machine, the corner portion, projecting generally in the machine-towing direction beyond the support shaft, can abut against a road surface (ground surface). Thus, it is possible to prevent the support shaft from undesirably abutting against the road surface to be damaged.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which:

FIG. 11 is a sectional view taken along line 11-11 of FIG. 7;

FIG. 14 is a view showing the handle body retained in the deployed position;

DETAILED DESCRIPTION OF THE PREFERRED EMBODIMENTS

Figure 1:
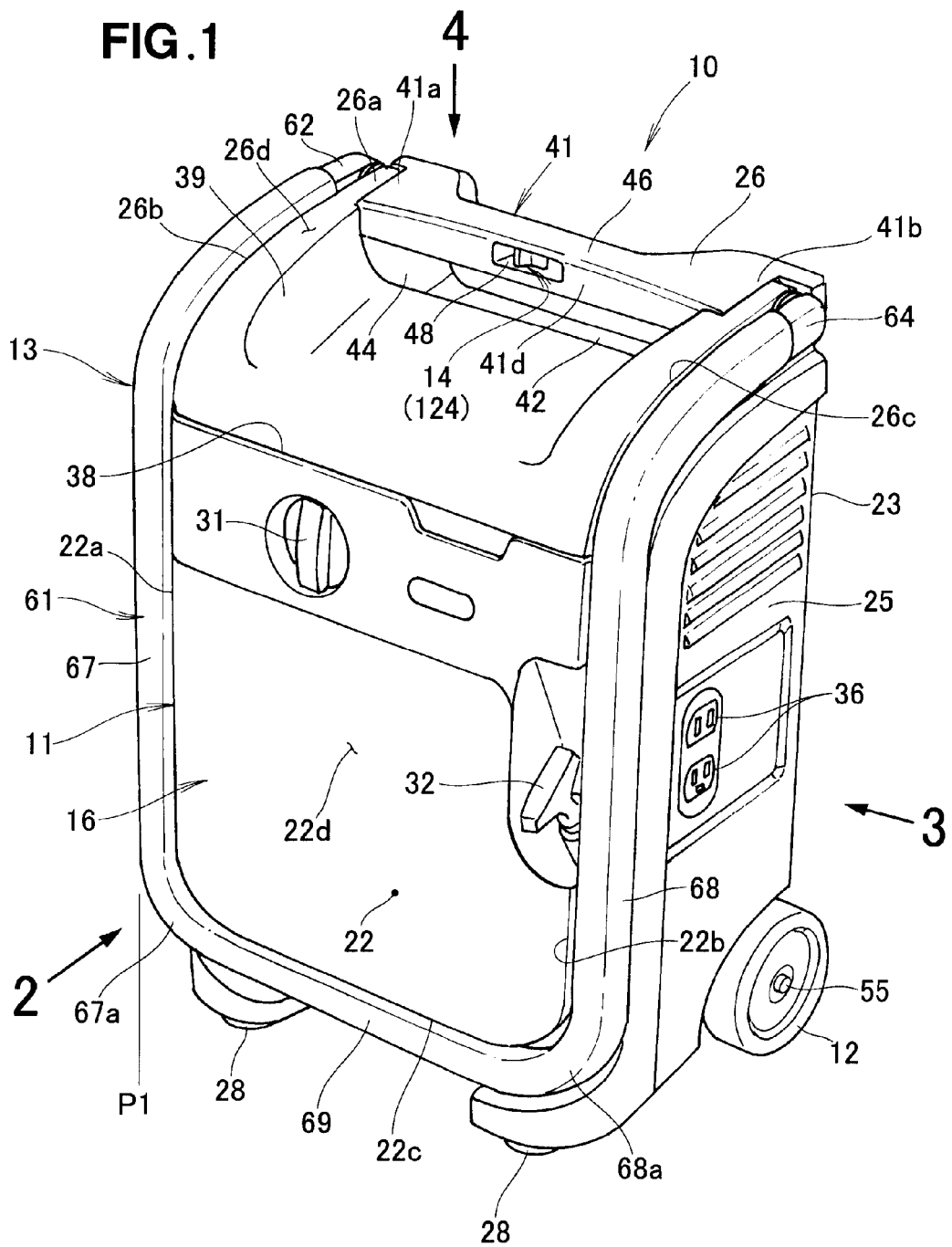
FIG. 1 is an overall perspective view showing a working machine according to an embodiment of the present invention.
Figure 2:
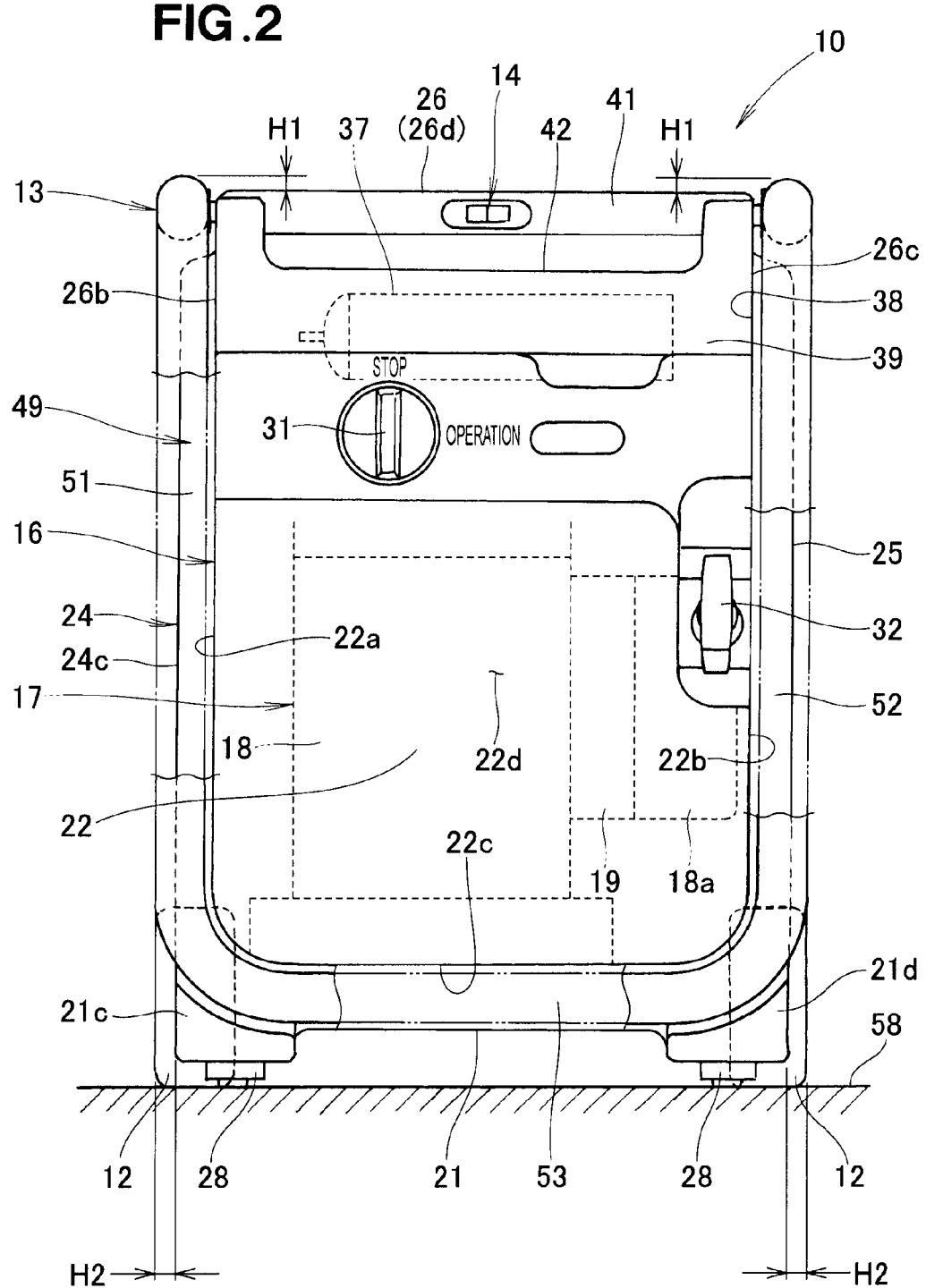
FIG. 2 is a view taken in the direction of arrow 2 in FIG. 1.

Reference is now initially to FIG. 1 showing in perspective a working machine 10 having a handle structure 13 (hereinafter referred to also as "working machine handle structure 13"), according to an embodiment of the present invention and to FIG. 2 showing the working machine as seen in the direction of arrow 2 in FIG. 1. In the illustrated example of FIG. 1, the working machine 10 is a portable, towing-type power generator, which includes: a working machine body 11 having a substantially rectangular parallelepiped contour or shape; left and right wheels 12 (the left wheel 12 is shown in FIG. 2) rotatably mounted on the machine body 11; the working machine handle structure 13 pivotably mounted on the machine body 11; and a handle lock structure 14 (see also FIG. 6) for retaining the handle structure 13 in a locked state or position.

The working machine body 11 includes a case 16 formed in a substantially rectangular parallelepiped shape, and an engine/generator unit 17 provided within the case 16.

As shown in FIGS. 2 to 5, the case 16 has: a bottom section 21 having a substantially rectangular shape as viewed in plan; a front wall section 22 extending upward from a front end region 21a of the bottom section 21; a rear wall section 23 extending upward from a rear end region (i.e., region near the end, in a machine-towing direction, the bottom section 21) 21b of the bottom section 21; a left side wall section 24 extending upward from a left end region 21c of the bottom section 21; a right side wall section 25 extending upward from a right end region 21d of the bottom section 21; and a top section 26 provided on the respective upper ends of the front and rear wall sections 22 and 23 and left and right side wall sections 24 and 25. The front wall section 22, which is located adjoining the top section 26, has its upper end connecting with an end of the top section 26, and, as viewed in side elevation, the top section 26 arcuately extends from the upper end of the front wall section 22 generally in the machine-towing direction.

The front wall section 22 is an operating wall section where are provided an operation start/stop switch 31 and a starter knob 32. The operation stop/operation selection switch 31 is a rotary switch for switching the engine/generator unit 17 between an operating state and a non-operating state. The operation stop/operation selection switch 31 is a member that needs to be protected (i.e., to-be-protected member). The starter knob 32 is a to-be-protected member for activating a recoil starter 18a (FIG. 2) that in turn activates the engine/generator unit 17.

Figure 4:
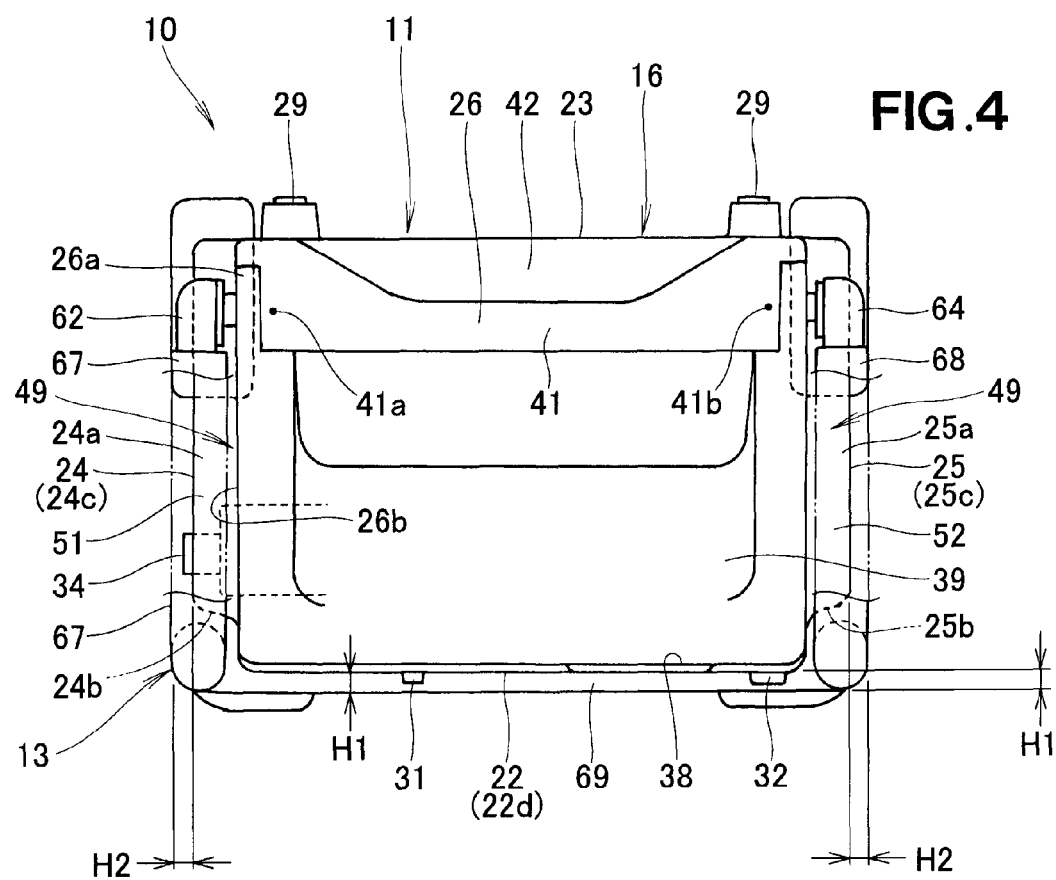
FIG. 4 is a view taken in the direction of arrow 4 in FIG. 1.

A maintenance cover (not shown) for permitting repair and inspection of the working machine 10 is provided substantially centrally on the rear wall section 23. A later-described grip 41, which is formed as part of the top section 26, is connected at opposite ends to upper-end left and right side portions of the rear wall section 23. Further, as best seen in FIG. 4, left and right carrying foot portions 29 are provided near the upper end of the rear wall section 23.

The left and right carrying foot portions 29 are designed to contact the floor surface of a trunk or luggage compartment 146 (FIG.) of a vehicle 145, for example, when the working machine 10 is put in the vehicle 145 in a posture or position inclined about 90 degrees (i.e., in a laid-down position). In this way, the vertically-elongated working machine 10 can be put in the luggage compartment 146 in a stable manner using the left and right carrying foot portions 29 and left and right wheels 12.

The left side wall section 24 is an exhaust discharging side wall section having an exhaust outlet 34 (FIG. 4) formed therein. The exhaust outlet 34 is also a to-be-protected member for discharging exhaust gas of an engine 18 included in the engine/generator unit 17.

Figure 3:
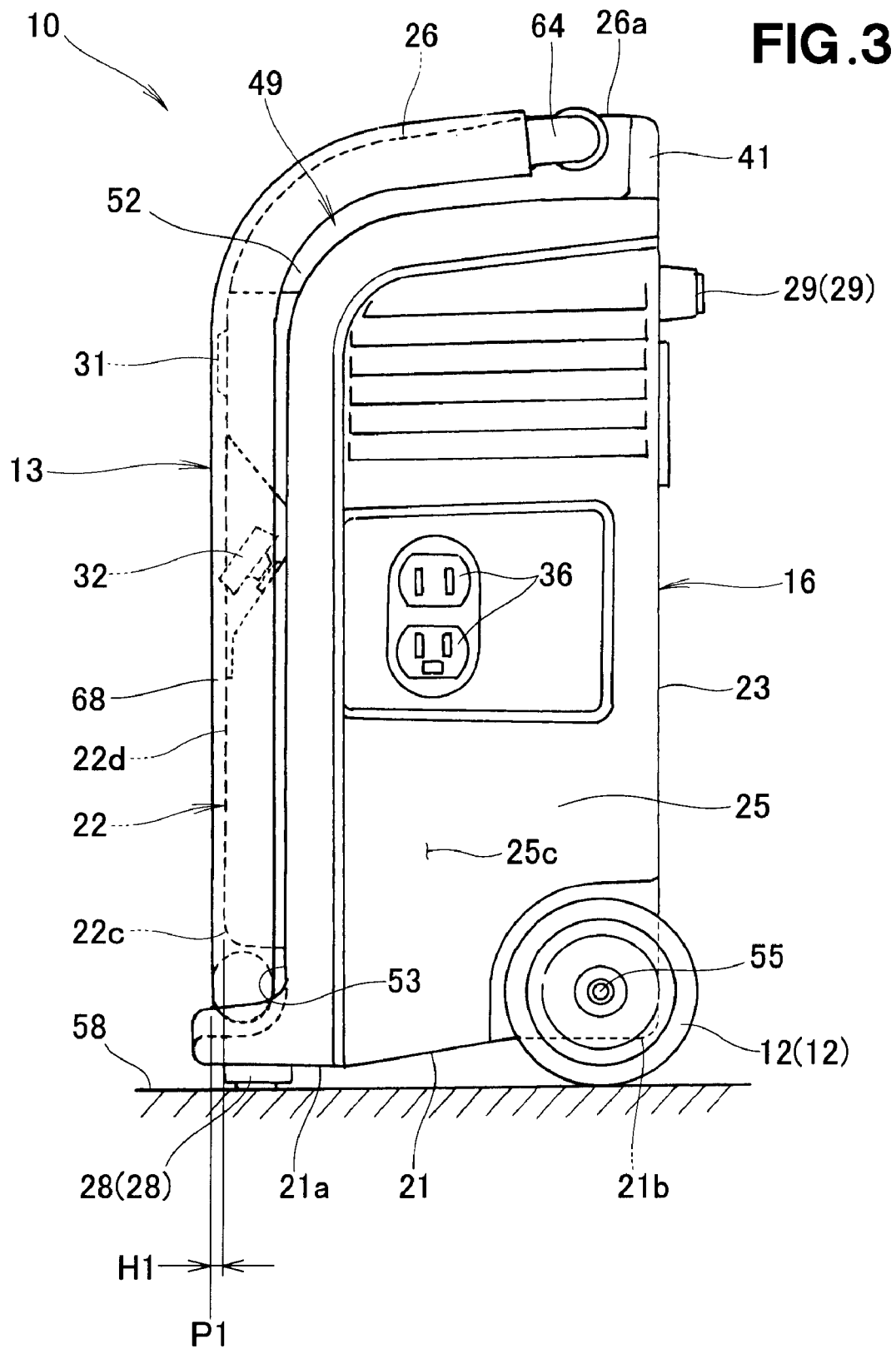
FIG. 3 is a view taken in the direction of arrow 3 in FIG. 1.
Figure 5:
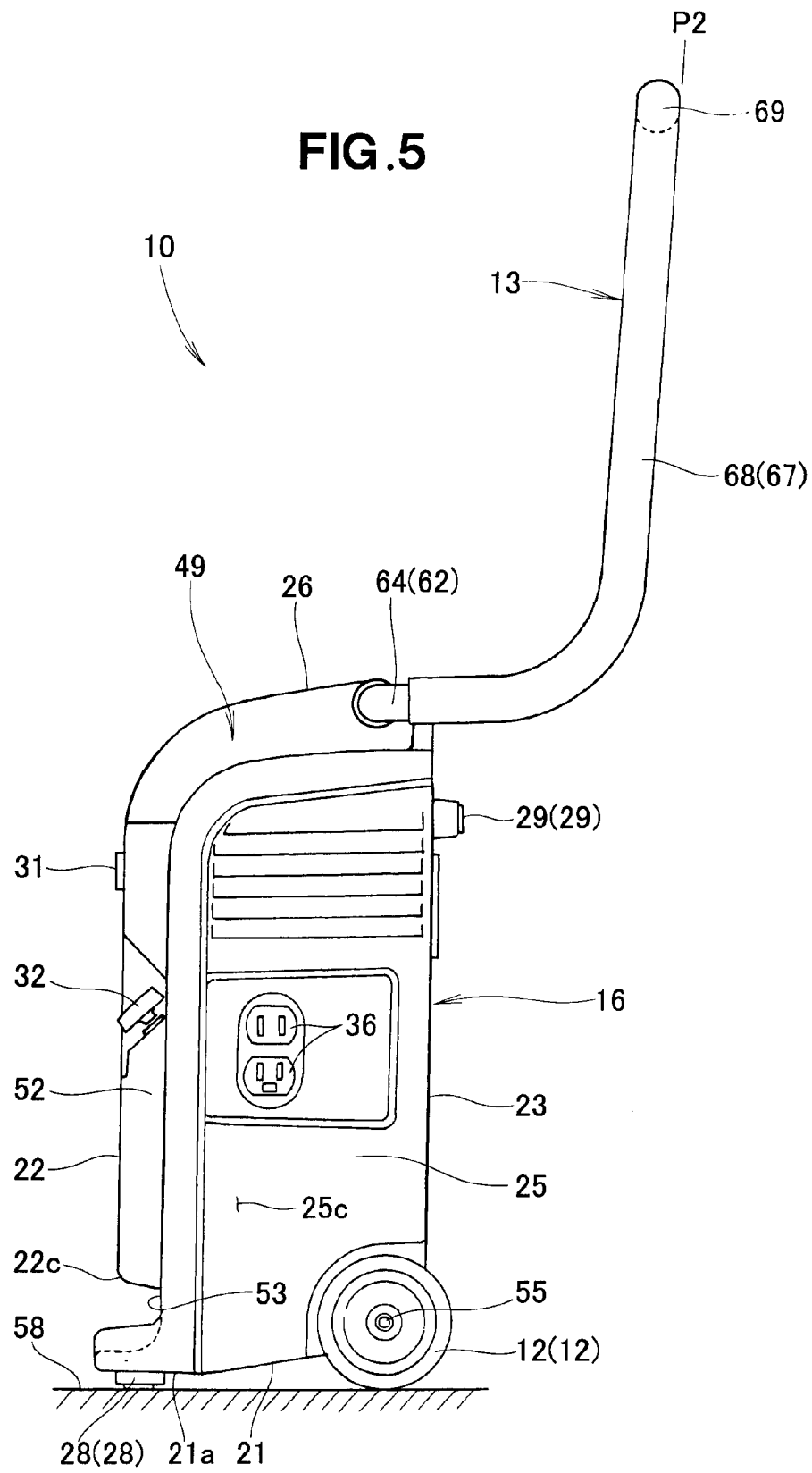
FIG. 5 is a side view showing a handle body of a handle structure shown in FIG. 3 extended to a deployed position.

The right side wall section 25 is an electric-power taking-out side wall section having electric outlets 36 provided thereon, as best seen in FIGS. 3 and 5. The electric outlets 36 are also to-be-protected members for taking out electric power generated by the engine/generator unit 17.

The top section 26 includes an opening portion 38 for accommodating therein a cassette gas cylinder or canister 37 (FIG. 2), a cover portion 39 covering the opening portion 38, and a machine-carrying grip 41. The cassette gas canister 37 is a replaceable to-be-protected member having gas filled therein for use as fuel of the engine 18. The top section 26 also has a recessed portion 42 (see also FIGS. 1 and 11) formed in a rear end region 26a adjacent to the end, in the machine-towing direction, of the top section 26, and the grip 41 is located over the recessed portion 42.

Figure 6:
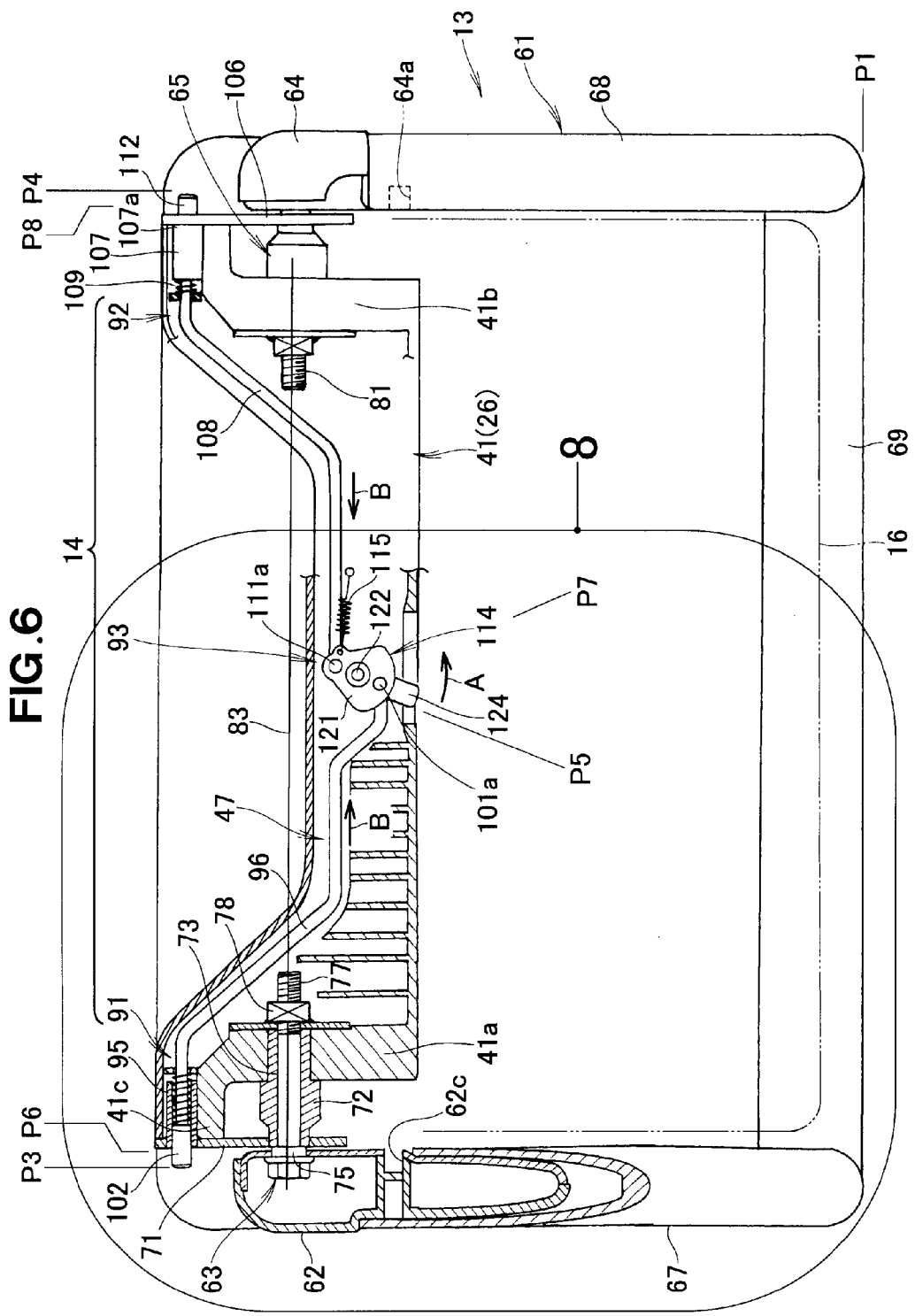
FIG. 6 is a side view showing the handle body of the handle structure retracted or collapsed to a stored position.

As seen in FIG. 1, the grip 41 is a bar-shaped member secured at its left and right ends to the upper-end left and right side portions of the rear wall section 23 and extending between the upper-end left and right side portions of the rear wall section 23 over the recessed portion 42. More specifically, the grip 41 has a left foot portion 44 (see also FIG. 11) secured to the upper-end left side portion of the rear wall section 23, a right foot portion (not shown) secured to the upper-end right side portion of the rear wall section 23, and a straight grip body portion 46 formed integrally with and extending or spanning between the left foot portion 44 and right foot portion. The grip body portion 46 has a later-described hollow portion formed therein to extend in a longitudinal (or left-right) direction thereof, as seen in FIG. 6.

Figure 18A:
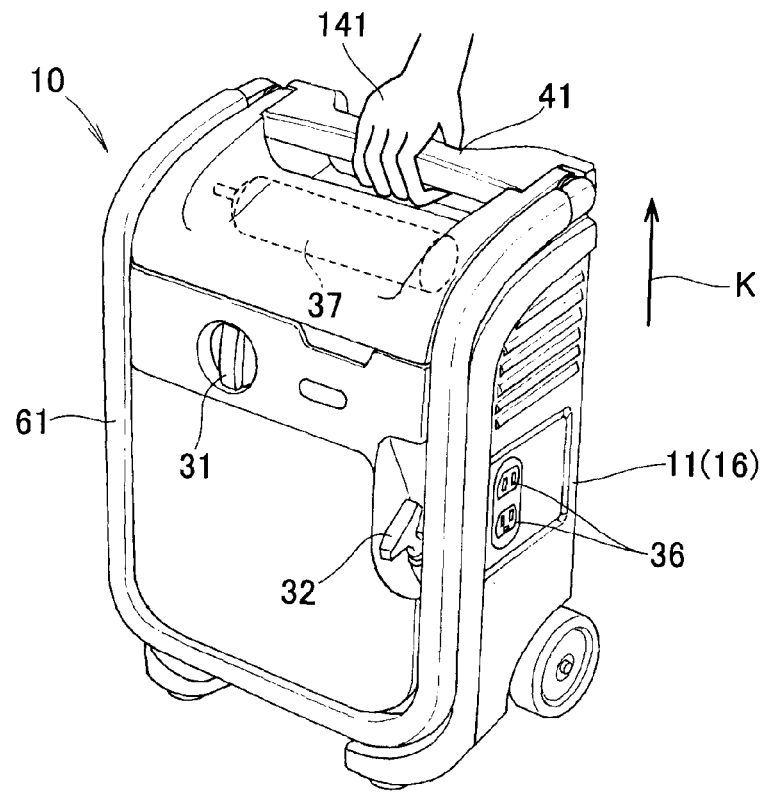
FIG. 18 is a view explanatory of an example manner in which the working machine provided with the handle structure is put into a luggage compartment.
Figure 18B:
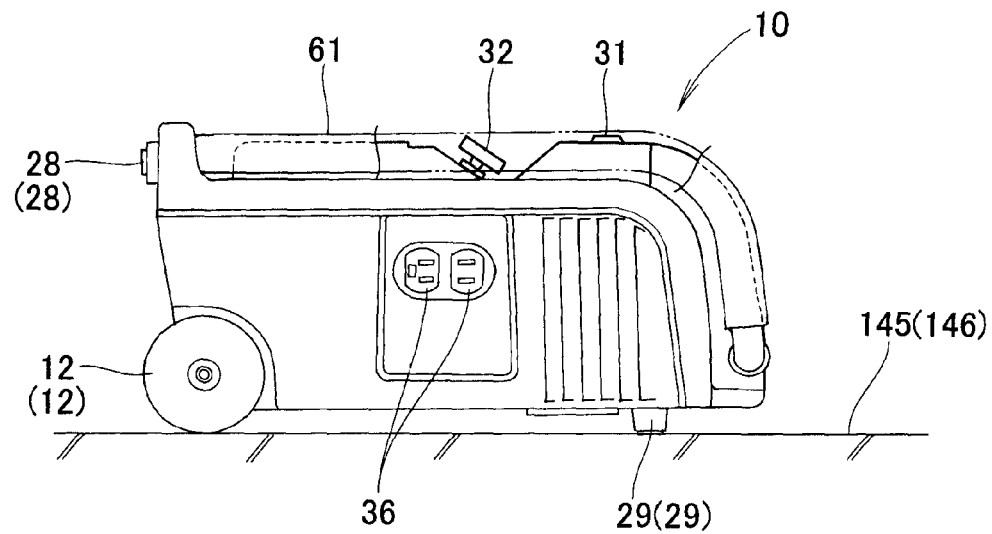

By a human operator or user holding the grip 41 and lifting up the working machine 10, the working machine 10 can be put into the luggage compartment 146 (FIG. 18B).

As shown in FIGS. 2 to 5, a recessed section 49 for storing therein a later-described handle body (machine-towing handle) 61 is formed in the case 16 along the outer periphery of the case 16. The handle-storing recessed section 49 has a left storing recessed portion 51 formed in a left side (outer peripheral) portion 26b of the top section 26 and in a left side (outer peripheral) portion 22a of the front wall section 22; a right storing recessed portion 52 formed in a right side (outer peripheral) portion 26c of the top section 26 and in a right side (outer peripheral) portion 22b of the front wall section 22; and a bottom storing recessed portion 53 formed in a lower end (outer peripheral) portion 22c of the front wall section 22.

The left and right storing recessed portions 51 and 52 are formed in left-right symmetrical relation to each other, and each of the storing recessed portions 51 and 52 has a substantially L shape as viewed in side elevation; details of the right storing recessed portion 52 are seen in FIGS. 3 and 5. The bottom storing recessed portion 53 is formed to extend horizontally in the left-right direction as viewed in front elevation (see FIG. 2).

As shown in FIG. 2, the handle-storing recessed section 49 is a continuous recessed section having a substantially U shape, as viewed in plan, defined with the left and right storing recessed portions 51 and 52 and bottom storing recessed portion 53.

As further shown in FIG. 2, the engine/generator unit 17 comprises an integral combination of the engine 18 mounted on the bottom section 21 and a power generator 19 drivable by the engine 18. In the illustrated example, the engine 18 is a gas engine drivable by gas supplied by the cassette gas canister 37. In the engine/generator unit 17, the engine 18 rotates the rotor of the power generator 19 around the outer periphery of the stator so that electric power can be generated.

Further, as shown in FIGS. 2 and 3, the left wheel 12 is a machine-towing wheel rotatably mounted on the left side of the rear end region 21b of the bottom section 21 (i.e., corner portion defined between the bottom section 21 and the rear wall section 23) via a rotation shaft 55. Similarly, the right wheel 12 is a machine-towing wheel rotatably mounted on the right side of the rear end region 21b of the bottom section 21 via the rotation shaft 55.

The rear end region 21b of the bottom section 21 is near the end, in the machine-towing direction, of the bottom section 21. Namely, the left and right wheels 12 are rotatably mounted on the end region 21b located near the end, in the machine-towing direction, of the bottom section 21. The left and right wheels 12 are members provided in left-right symmetric relation to each other.

Further, left and right foot portions 28 are provided on the underside of the front end region 21a of the bottom section 21. The working machine 10 can be retained stable in a vertically upright position with the left and right foot portions 28 and left and right wheels 12 placed on a road surface 58.

As shown in FIGS. 1 and 4, the handle structure 13 is mounted on the top section 26 of the working machine body 11. The handle structure 13 includes: the handle body (i.e., machine-towing handle) 61 that can be stored along outer peripheral portions of the case 16; a left support section 63 (FIG. 6) that pivotably supports a left base section 62 of the handle body 61 on a left end portion 41a of the grip 41 (hereinafter referred to as "left grip end portion 41a"); and a right support section 65 (FIG. 6) that pivotably supports a right base section 64 of the handle body 61 on a right end portion 41b of the grip 41 (hereinafter referred to as "right grip end portion 41b").

The left and right support sections 63 and 65 are provided in left-right symmetric relation to each other, and, thus, the following mainly describe in detail the left support section 63.

The handle body 61 includes: a left handle section 67 where the left base section 62 is rotatably supported on the left grip end portion 41a (i.e., left end portion of the top section 26); a right handle section 68 where the right base section 64 is rotatably supported on the right grip end portion 41b (i.e., right end portion of the top section 26); and a handle grip 69 connecting between the respective distal ends 67a and 68a of the left and right handle sections 67 and 68. The handle body (machine-towing handle) 61 is pivotally mounted on end portions, in the machine-towing direction, of the top section 26.

In the left handle section 67, the left base section 62 is rotatably supported on the left grip end portion 41a by means of the left support section 63 (see FIG. 6), and the left handle section 67 is formed in a substantially L shape as viewed in side elevation such that it can be stored in the left storing recessed portion 51 (FIG. 2).

With the left handle section 67 stored in the left storing recessed portion 51 (i.e., retracted to a stored position P1 as shown in FIGS. 6 and 3), the left handle section 67 is disposed along the left side (outer peripheral) portion 26b of the top section 26 and along the left side (outer peripheral) portion 22a of the front wall section 22.

Further, with the left handle section 67 in the stored position P1, the left handle section 67 projects outwardly (i.e., upwardly) beyond the upper end surface 26d of the top section 26 by a projecting length H1 (FIG. 2) and projects outwardly (i.e., forwardly) beyond the front end surface 22d of the front wall section 22 by a projecting length H1 (FIG. 3).

Further, with the left handle section 67 in the stored position P1, the left handle section 67 is disposed along the upper end (outer peripheral) portion 24a and front end (outer peripheral) portion 24b of the left wall section 24.

Furthermore, with the left handle section 67 in the stored position P1, the left handle section 67 projects outwardly (leftwardly) beyond the left end surface 24c of the left wall section 24 by a projecting length H2, and the left wheel 12 projects outwardly (leftwardly) beyond the left end surface 24c of the left wall section 24 by the projecting length H2, as shown in FIGS. 2 and 4.

In the right handle section 68, the right base section 64 is rotatably supported on the right grip end portion 41b by means of the right support section 65 (FIG. 6), and the right handle section 68 is formed in a substantially L shape as viewed in side elevation such that it can be stored in the right storing recessed portion 52.

With the right handle section 68 stored in the right storing recessed portion 52 (i.e., stored in a stored position P1), the right handle section 68 is disposed along the right side (outer peripheral) portion 26c of the top section 26 and along the right side (outer peripheral) portion 22b of the front wall section 22.

With the right handle section 68 in the stored position P1, the handle 26 projects outwardly (i.e., upwardly) beyond the upper end surface 26d of the top section 26 and projects outwardly (i.e., forwardly) beyond the front end surface 22d of the front wall section 22 by the projecting length H1.

Further, with the right handle section 68 in the stored position P1, the right handle section 68 is disposed along an upper end (outer peripheral) portion 25a and front end (outer peripheral) portion 25b of the right wall section 25.

Furthermore, with the right handle section in the stored position P1, the right handle section 68 projects outwardly (rightwardly) beyond the right end surface 25c of the right wall section 25 by a projecting length H2, and the right wheel 12 projects outwardly (rightwardly) beyond the right end surface 25c of the right wall section 25 by the projecting length H2.

The handle grip 69 is disposed horizontally as viewed in plan so that it can be stored in the bottom storing recessed portion 53 (FIG. 3). With the handle grip 69 stored in the bottom storing recessed portion 53 (i.e., stored in the stored position P1), the handle grip 69 is disposed along the lower end (outer peripheral) portion 22c of the front wall section 22.

With the handle grip 69 in the stored position P1, the handle grip 69 projects outwardly (forwardly) beyond the front end surface 22d of the front wall section 22 by the projecting length H1.

With the left handle section 67 and right handle section 68 projecting outwardly beyond the upper end surface 26d of the top section 26 by the projecting length H1 (FIG. 2), the cassette gas canister (to-be-protected member) 37 can be protected with the left handle section 67 and right handle section 68.

Further, with the left and right handle sections 67 and 68 and the handle grip 69 (namely, handle body 61) projecting outwardly (forwardly) beyond the front end surface 22d of the front wall section 22 by the projecting length H1 (FIG. 3), the operation start/stop switch (to-be-protected member) 31 and the starter knob (to-be-protected member) 32 can be protected with the handle body 61.

Furthermore, the handle body 61 can also be used as a member for protecting the to-be-protected members, such as the cassette gas canister 37, operation start/stop switch 31 and starter knob 32.

With the aforementioned arrangements of the handle structure 13, the instant embodiment can reliably protect the to-be-protected members, such as the cassette gas canister 37, operation start/stop switch 31 and starter knob 32, without providing dedicated guard members and thus can avoid an increase in the number of necessary component parts.

Further, with the left handle section 67 projecting outwardly (leftwardly) beyond the left end surface 24c of the left wall section 24 by the projecting length H2, the exhaust outlet 34 (FIG. 4), which is another to-be-protected member, can be protected with the left handle section 67. The exhaust outlet 34 (FIG. 4) can be protected even more effectively with the left wheel 12 projecting outwardly (leftwardly) beyond the left end surface 24c of the left wall section 24 by the projecting length H2.

Furthermore, with the right handle section 68 projecting outwardly (rightwardly) beyond the right end surface 25c of the right wall section 25 by the projecting length H2, the electric outlets 36, which are also to-be-protected members, can be protected with the right handle section 68. The electric outlets 36 can be protected even more effectively with the right wheel 12 projecting outwardly (rightwardly) beyond the right end surface 25c of the right wall section 25 by the projecting length H2.

Thus, the aforementioned arrangements permits provision of the to-be-protected members, i.e. exhaust outlet 34 and electric outlets 36, on the left and right side wall sections 24 and 25 and thereby achieve an enhanced design freedom of the working machine.

Additionally, the left handle section 67 can be used also as a member for protecting the exhaust outlet 34, and the right handle section 68 can be used also as a member for protecting the electric outlets 36.

With such arrangements too, the instant embodiment of the working machine 10 can reliably protect the exhaust outlet 34 and electric outlets 36 without providing dedicated guard members and thus can avoid an increase in the number of necessary component parts.

Figure 7:
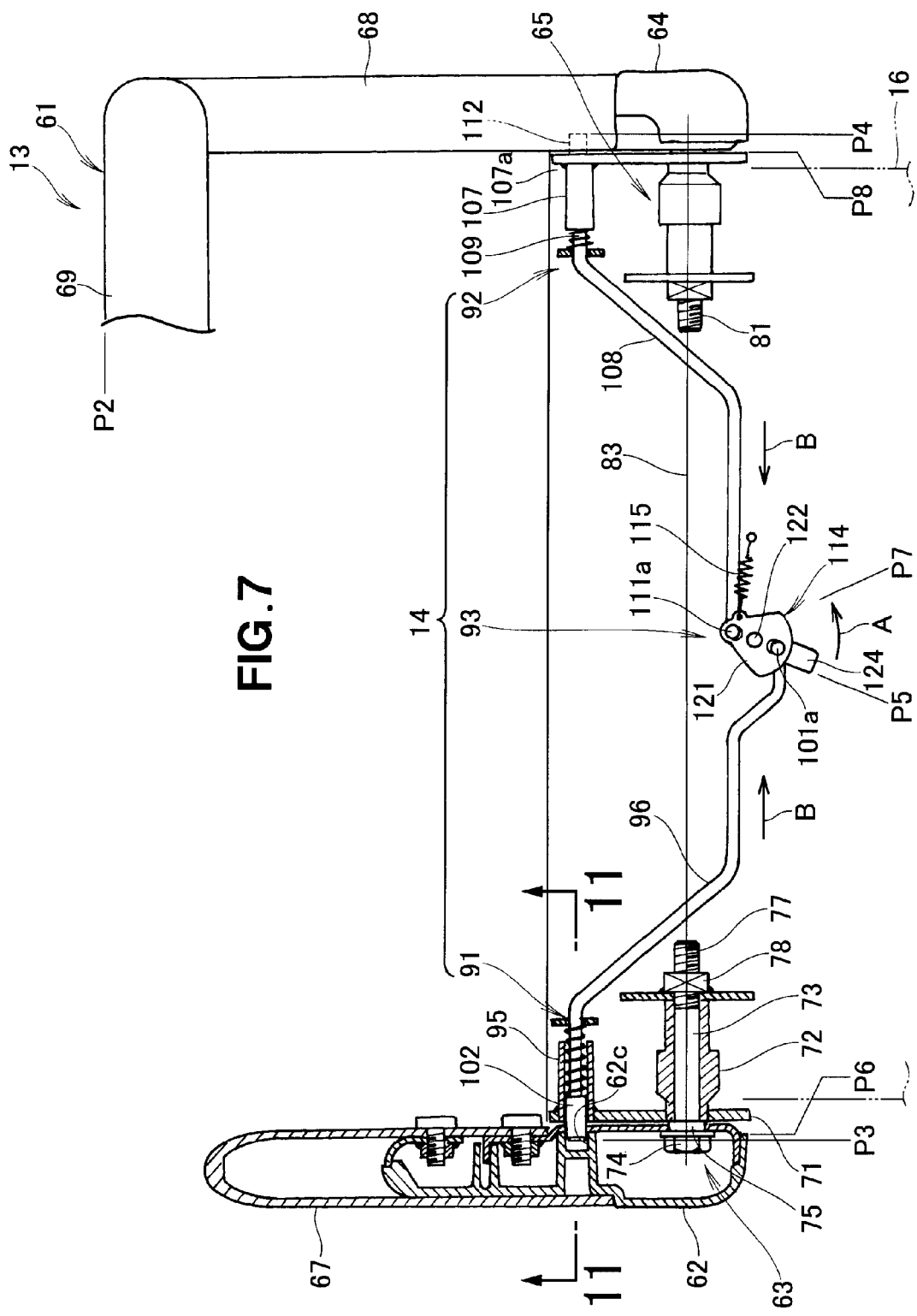
FIG. 7 is a sectional view showing the handle body of the handle structure extended to the deployed position.
Figure 8:
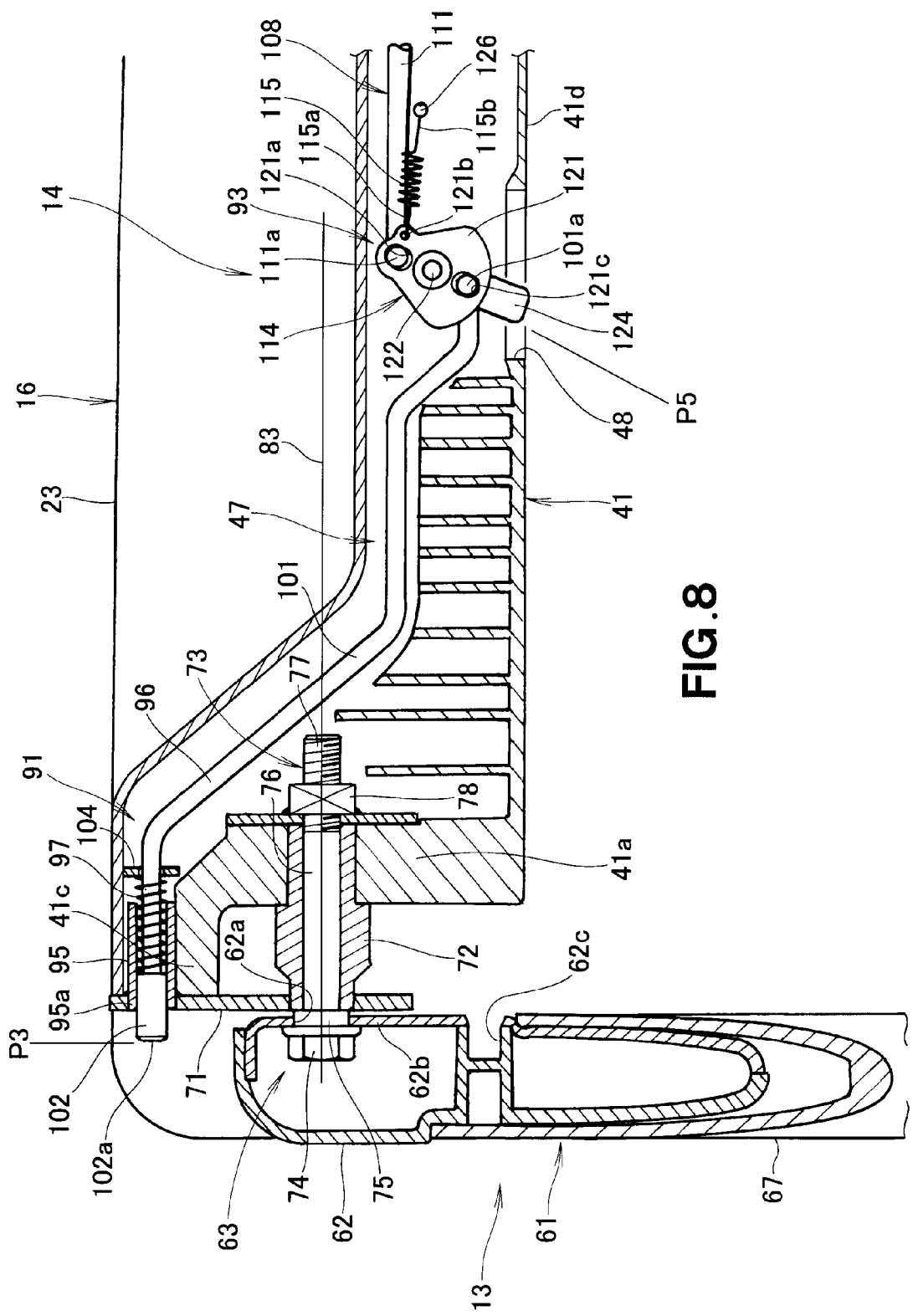
FIG. 8 is a fragmentary enlarged view of a section depicted at 8 in FIG. 6.

As shown in FIGS. 6 to 8, the left support section 63 includes: a left support bracket 71 abutted against a projection 41c of the left grip end portion 41a; a left supporting cylindrical member 72 projecting from the left support bracket 71 to the left grip end portion 41a; and a left support shaft 73 extending through the supporting cylindrical member 72 to pivotably support or mount the left base section 62 of the left handle section 67 on the machine body 11.

The projection 41c projects leftward from the rear end of the left grip end portion 41a. The left support shaft 73 has an increased-diameter portion 75 provided adjacent to its head portion 74, and a threaded portion 77 provided on a distal end region of its support shaft portion 76.

The increased-diameter portion 75 is fitted in a mounting hole 62a of the left base section 62, the support shaft portion 76 is passed through the supporting cylindrical member 72, and the threaded portion 77 projecting beyond the cylindrical member 72 is screwed to a welded nut 78. In this manner, a mounting portion 62b of the left base section 62 is pivotably supported on the increased-diameter portion 75, and thus, the left handle section 67 is supported on the left grip end portion 41a in such a manner that it is pivotable about the support shaft 73.

Because the threaded portion 77 is screwed to the welded nut 78, frictional force is produced between the mounting portion 62b of the left base section 62 and the head 74 and between the mounting portion 62b and the left support bracket 71. With such frictional force, the left handle section 67 can be held in a desired position.

Furthermore, the left base section 62 has a left engaging hole (engaging portion) 62c in which a later-described left lock pin 102 is engaged (fitted).

Similarly to the left handle section 67, the right handle section 68 is supported on the right grip end portion 41b in such a manner that it is pivotable about a support shaft 81 of the right support section 65. Further, the right handle section 68 can be held in a desired position with frictional force similarly to the left handle section 67.

Furthermore, the right base section 64 has a right engaging hole (engaging portion) 64a in which a later-described right lock pin 112 is engaged (fitted).

With the aforementioned arrangements, the handle body 61 is supported on the left and right grip end portions 41a and 41b (i.e., on left and right end portions of the rear end region 26a of the top section 26), via the left and right support shafts 73 and 81, in such a manner that it can pivot about the left and right support shafts 73 and 81 and can be held in a desired position.

Note that the left and right grip end portions 41a and 41b constitute left and right end portions of the rear end region 26a of the top section 26; in other words, the left and right grip end portions 41a and 41b are end portions, in the machine-towing direction, of the machine body 11.

Namely, the handle body 61 is pivotably mounted at its left and right base sections 62 and 64 on the end portions, in the machine-towing direction, of the machine body. In other words, the grip 41 is disposed between the left and right handle sections 67 and 68 (more specifically, between the left and right base sections 62 and 64), and the grip 41 is located near and generally over an extension line 83 of the left and right support shafts 73 and 81 pivotably supporting or mounting the left and right handle sections 67 and 68 on the machine body 11.

According to the above-described handle structure 13, the handle body 61 is pivotally movable between the stored position P1 (FIG. 3) where the handle body 16 is stored in the case 16 and the deployed position P2 (FIG. 5) where the handle body 61 is deployed from the case 16, by the human operator pivoting the handle body 61 about the left and right support shafts 73 and 81. Further, the working machine body 11 can be towed by the human operator pulling the handle grip 69 of the handle body 61 extended to the deployed position P2.

The hollow portion 47 is formed in the machine-carrying grip 41 to extend in the longitudinal (left-right) direction of the grip 41, and the handle lock structure 14 is accommodated in the hollow portion 47.

Figure 9:
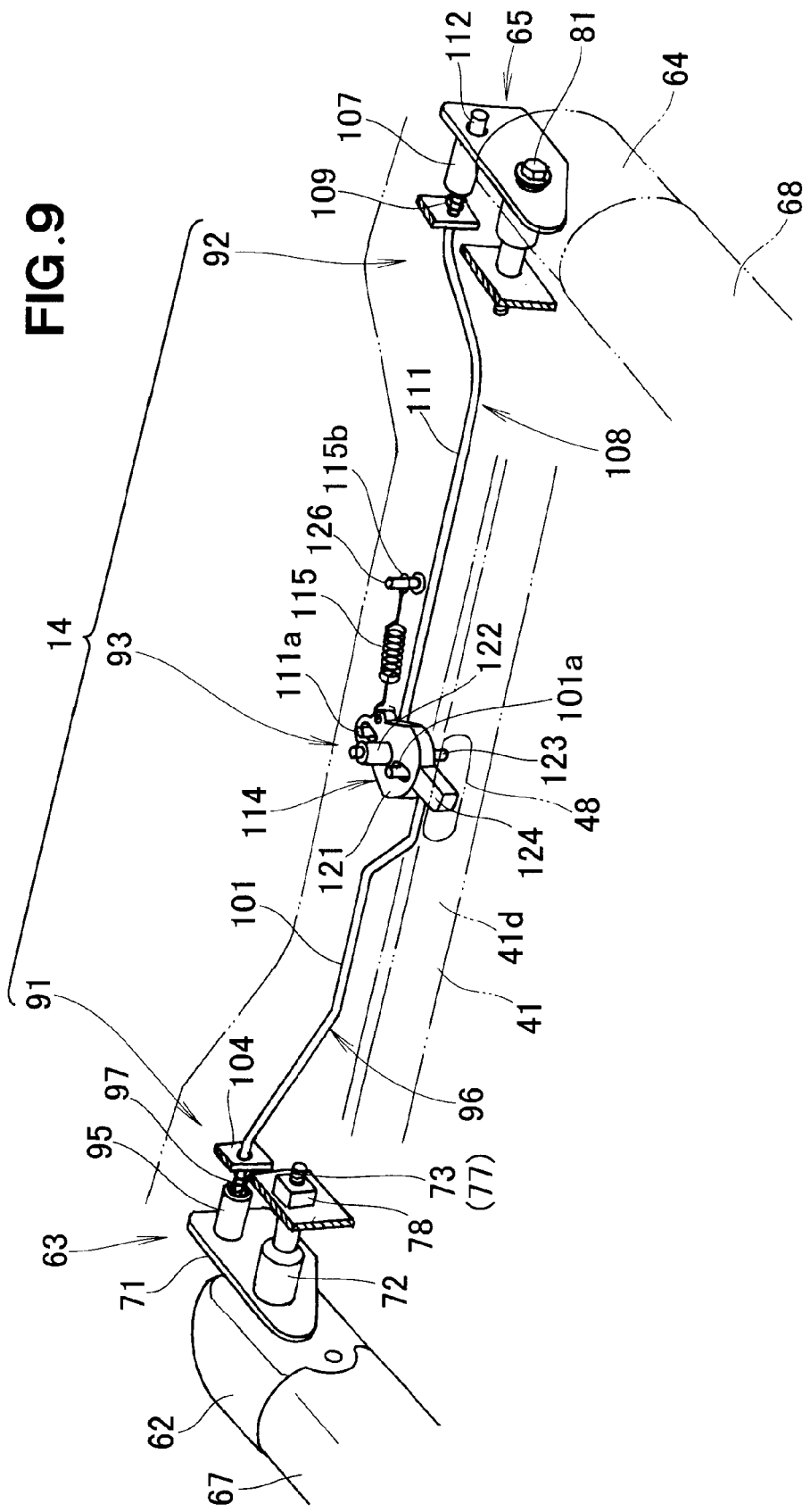
FIG. 9 is a perspective view showing a handle lock structure for locking the handle body of the handle structure.
Figure 10:
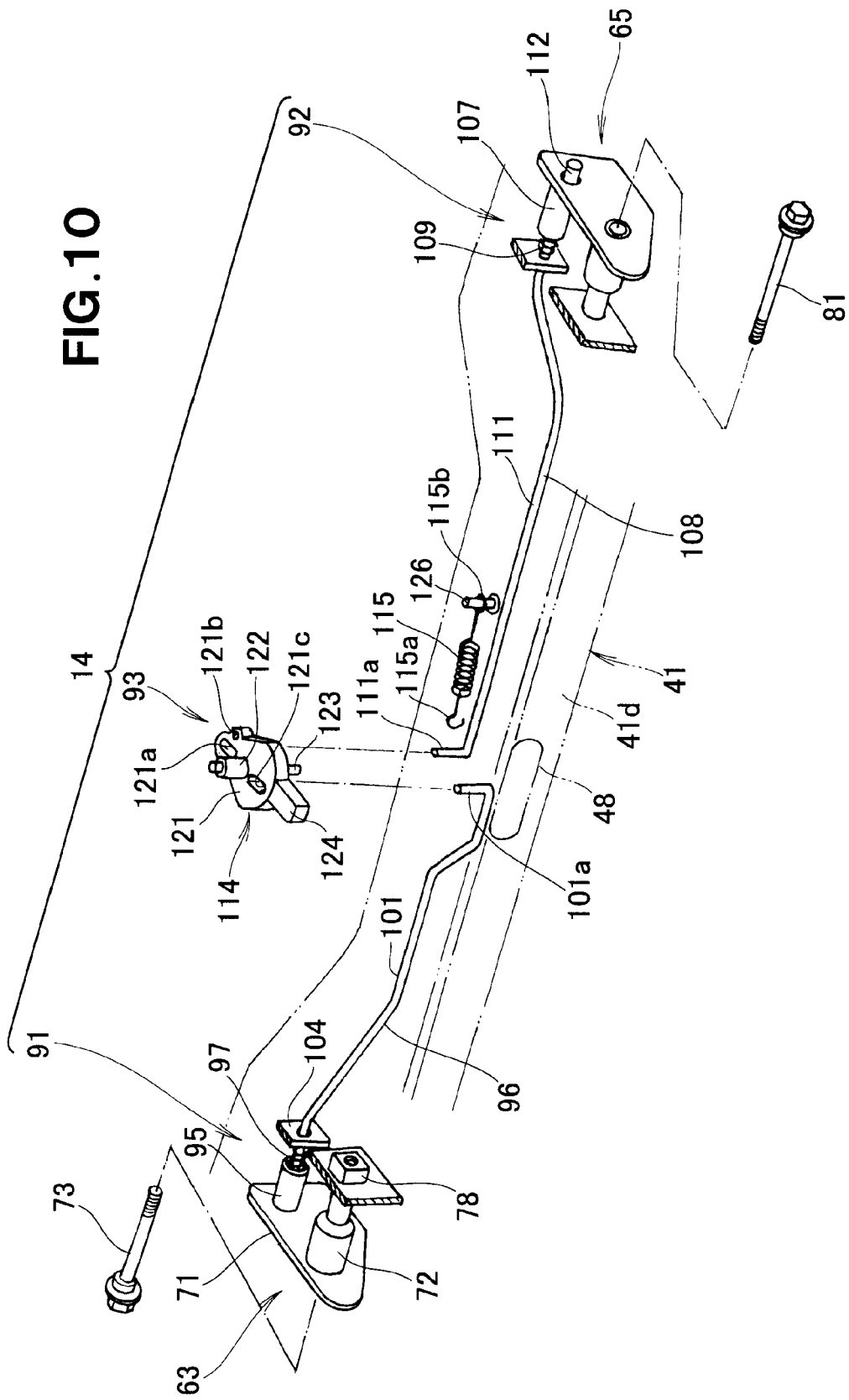
FIG. 10 is an exploded perspective view of the handle lock structure shown in FIG. 9.

As shown in FIGS. 9 and 10, the handle lock structure 14 includes a left lock section 91 for retaining (locking) the left handle section 67 in the deployed position P2, a right lock section 92 for retaining (locking) the right handle section 68 in the deployed position P2, and a lock cancellation section 93 for canceling the retention (locking), by the left and right lock sections 91 and 92, of the left and right handle sections 67 and 68.

As shown in FIG. 8, the left lock section 91 includes a left guiding cylinder portion 95 provided on the left support bracket 71, a left lock member 96 (one of a pair of lock members) movably supported on the guiding cylinder portion 95, and a left return spring 97 for retaining the lock member 96 in a left lock position P3.

The left guiding cylinder portion 95 has its proximal end portion 95a provided on a rear end portion of the left support bracket 71, and it is located rearwardly of the left support shaft 73 and extends horizontally rightward.

The left lock member 96 has a left rod body 101 accommodated in a left space of the hollow portion 47 of the grip 41, a distal end portion (hereinafter referred to as "left lock pin") 102 of the rod body 101 slidably supported in the guiding cylinder portion 95, and a proximal end portion 101a of the rod body 101 is bent vertically upward. The left lock pin 102 is an increased-diameter portion of the rod body 101, and the left return spring 97 has one end abutted against the inner surface of the left lock pin 102.

The left return spring 97 is fitted over a portion of the rod body 101 adjacent to the lock pin 102 coaxially with the rod body 101 and with the guiding cylinder portion 95. The left return spring 97 is axially compressed between the left lock pin 102 and a stopper piece 104.

Biasing force of the left return spring 97 acts on the left lock pin 102 so that the left lock pin 102 is normally retained in the left lock position P3 projecting leftwardly beyond the proximal end portion 95a of the guiding cylinder portion 95. In this manner, the left handle section 67 can be retained in the deployed position (FIG. 5) with the left lock pin 102 locked in the engaging hole 62c (i.e., with the engaging hole 62c engaged with the left lock pin 102).

As shown in FIGS. 6 and 7, the right lock section 92 includes a right guiding cylinder portion 107 provided on a right support bracket 106, a right lock member 108 (the other of the pair of lock members) movably supported on the right guiding cylinder portion 107, and a right return spring 109 for retaining the right lock member 108 in a right lock position P4.

Biasing force of the right return spring 109 acts on a distal end portion (hereinafter referred to as "right lock pin") 112 of the right lock member 108 so that the right lock pin 112 is normally retained in the right lock position P4 projecting rightwardly beyond a proximal end portion 107a of the guiding cylinder portion 107. In this manner, the right handle section 68 can be retained in the deployed position with the right lock pin 112 locked in the right engaging hole 64a (i.e., with the right engaging hole 64a engaged with the right lock pin 112).

The handle body 61 can be retained in the deployed position P2 by the left and right handle sections 67 and 68 being retained in the deployed position P2 by means of the left and right lock sections 91 and 92. The left and right lock sections 91 and 92 are members provided in left-right symmetric relation to each other and operating in the same manner, and thus, the following mainly describe in detail the left lock section 91.

As shown in FIGS. 8 to 10, the lock cancellation section 93 includes a lock cancellation lever 114 for causing the left and right lock members 96 and 108 to operate in interlocked relation with each other, and a spring 115 for holding the lock cancellation lever 114 in a stable state.

The lock cancellation lever 114 is accommodated in a middle region, in the left-right direction, of the hollow portion 47 of the machine-carrying grip 41, i.e. in a horizontally middle region of the grip 41. The lock cancellation lever 114 includes an upper support pin 122 projecting upward from the upper surface of a lever body 121, a lower support pin 123 projecting downward from the lower surface of the lever body 121, a rear fitting hole 121a and engaging hole 121b formed in a rear end portion of the lever body 121, a front fitting hole 121c formed in a front end portion of the lever body 121, and an operating knob 124 projecting forward from the front end of the lever body 121.

The upper and lower support pins 122 and 123 are pivotably supported at their respective one ends on upper and lower wall portions, respectively, of the grip 41 defining the hollow portion 47, so that the lock cancellation lever 114 is pivotably mounted in the middle region of the hollow portion 47.

In the aforementioned state, the operating knob 124 slightly projects out of the grip opening 48 (see also FIG. 1). The grip opening 48 is in communication with the hollow portion 47 and opens centrally in a front wall portion 41d of the grip 41.

Further, a proximal end portion 111a of the right lock member 108 (i.e., proximal end portion of a right rod body 111) is inserted through the rear fitting hole 121a of the lock cancellation lever 114. A proximal end portion 101a of the left lock member 96 (i.e., proximal end portion of the left rod body 101) is inserted through the front fitting hole 121c of the lock cancellation lever 114.

Furthermore, the above-mentioned holding spring 115 is fixedly engaged at one end 115a with the engaging hole 121b of the lock cancellation lever 114 and at the other end 115b with an engaging pin 126. The engaging pin 126 projects upwardly from a lower wall portion of the grip 41 defining the hollow portion 47.

With the proximal end portion 111a of the right rod body 111 inserted through (engaged with) the rear fitting hole 121a and the proximal end portion 101a of the left rod member 101 inserted through (engaged with) the front fitting hole 121c as noted above, the biasing force of the left and right return springs 97 and 109 acts on the lock cancellation lever 114.

With such biasing force of the left and right return springs 97 and 109, the operating knob 124 of the lock cancellation lever 114 is retained in a knob lock position P5 (FIG. 8).

Further, manufacturing and assembling errors of the lock cancellation lever 114 can be absorbed by a biasing force of the holding spring 115, so that the operating knob 124 can be accurately held still in the knob lock position P5.

The lock cancellation lever 114 provided in the machine-carrying grip 41 in the aforementioned manner can be located near and generally over the extension line 83 (FIG. 6) of the left and right support shafts 73 and 81.

As shown in FIG. 6, the left and right lock pins 102 and 112 are provided near the left and right support shafts 73 and 81, respectively, so that the lock cancellation lever 114 can be provided near the left and right lock pins 102 and 112.

With the aforementioned arrangements, the instant embodiment can simplify the shape of the left and right lock members 96 and 108 and constructions of link mechanisms etc. employed in the embodiment, thereby simplifying the construction of the handle lock structure 14.

Further, as shown in FIG. 11 which is a sectional view taken along the 11-11 line of FIG. 7, the left base section 62 of the left handle section 67 has a substantially ellipsoidal sectional shape, and a portion 131 of the base section 62 opposed to the left support bracket 71 is formed in a curved shape. The portion 131 is curved from its outer end region 131a toward its inner end 131b in such a manner as to gradually approach the left support bracket 71.

Thus, as the left base section 62 of the left handle section 67 descends from above the left lock pin 102, the outer end region 131a of the curved portion 131 abuts against the distal end 102a of the left lock pin 102. As the left base section 62 further continues to descend after the abutment against the distal end 102a of the left lock pin 102, the curved portion 131 pushes the left lock pin 102 into the guiding cylinder portion 95 so that the left lock pin 102 is located in a left lock cancellation position P6.

When the left base section 62 has been shifted to its deployed position, the engaging hole 62c is located coaxially with the left lock pin 102, and the left lock pin 102 projects to the left lock position P3 by the biasing force of the left return spring 97. Thus, the left lock pin 102 is inserted into the left engaging hole 62c, so that the left engaging hole 62c is engaged by the left lock pin 102.

Therefore, when the left handle section 67 has been extended to the deployed position P2 (see FIG. 5), the left lock pin 102 is automatically engaged in the left engaging hole 62c, so that the left handle section 67 (and hence the handle body 61) can be retained in the deployed position P2.

Further, as shown in FIGS. 6 and 7, the single operating knob 124 is movable in a direction of arrow A from the knob lock position P5 to a knob lock cancellation position P7. As the operating knob 124 is moved from the knob lock position P5 to the knob lock cancellation position P7, the left and right lock pins 102 and 112 are pulled as indicated by arrows B toward the middle of the grip 41 against the biasing force of the left and right springs 97 and 109.

In the aforementioned manner, the left lock pin 102 moves from the left lock position P3 to the left lock cancellation position P6, while the right lock pin 112 moves from the right lock position P4 to a right lock cancellation position P8.

By the left lock pin 102 moving to the left lock cancellation position P6, the retention, by the left lock section 91, of the left handle section 67 can be canceled. Similarly, by the right lock pin 112 moving to the right lock cancellation position P8, the retention, by the right lock section 92, of the right handle section 68 can be canceled.

By cancelling the retained state of the left and right handle sections 67 and 68 as noted above, the handle body 61 can be caused to pivot from the deployed position P2 (see FIG. 7) to the stored position P1 (see FIG. 6).

Next, with reference to FIGS. 12-14, a description will be given about an example manner in which the handle body 61 of the working machine 10 is extended to the deployed position P2.

Figure 12A:
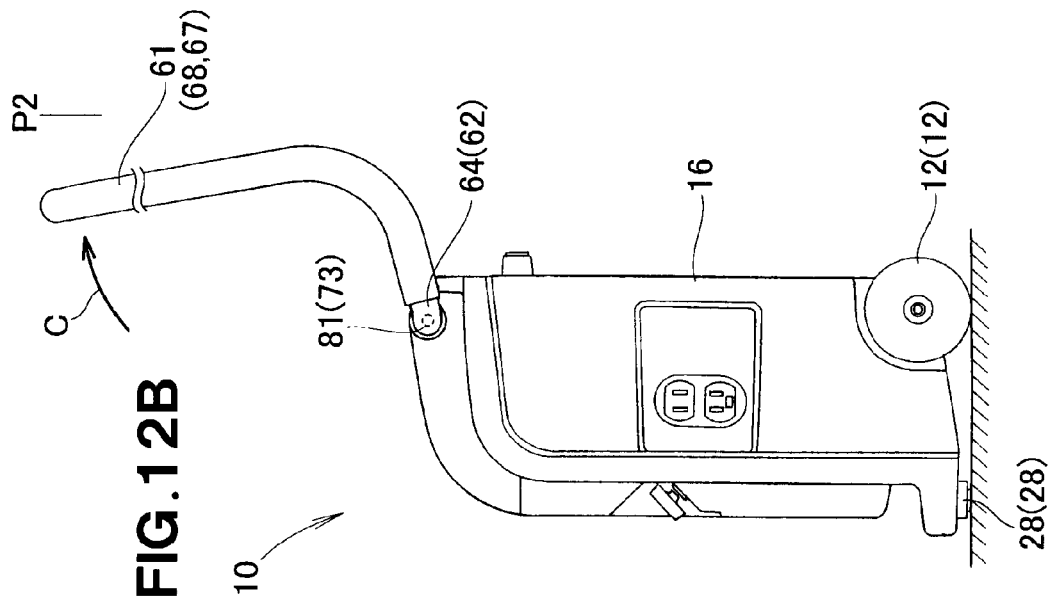
FIG. 12 is explanatory of an example manner in which the handle body is pivotally moved from the stored position toward the deployed position.
Figure 12B:
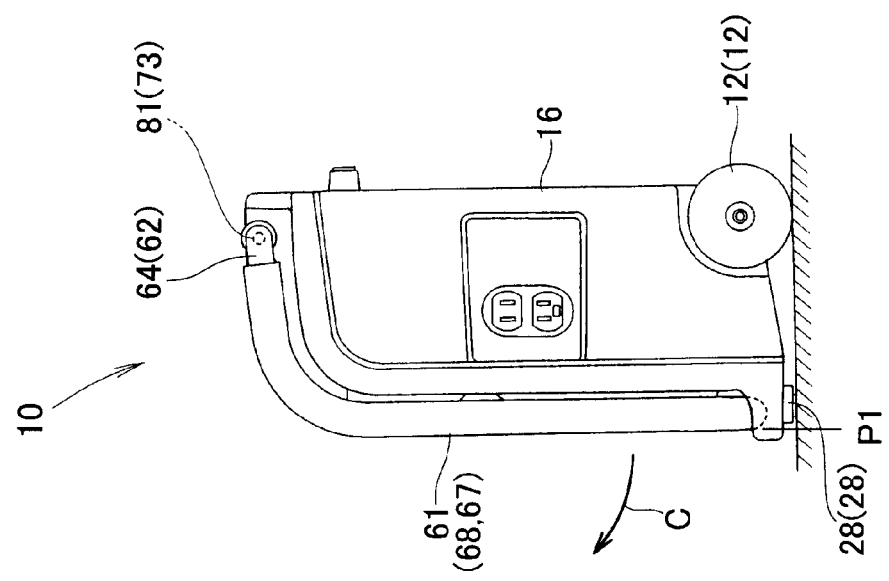

As shown in FIG. 12A, the human operator pivots the handle body 61 from the stored position P1 toward the deployed position P2 about the left and right support shafts 73 and 81 (see also FIG. 6), as indicated by arrow C. Thus, the handle body 61 (left and right handle sections 67 and 68) pivots to a point immediately before the deployed position P2, as shown in FIG. 12B.

Figure 13A:
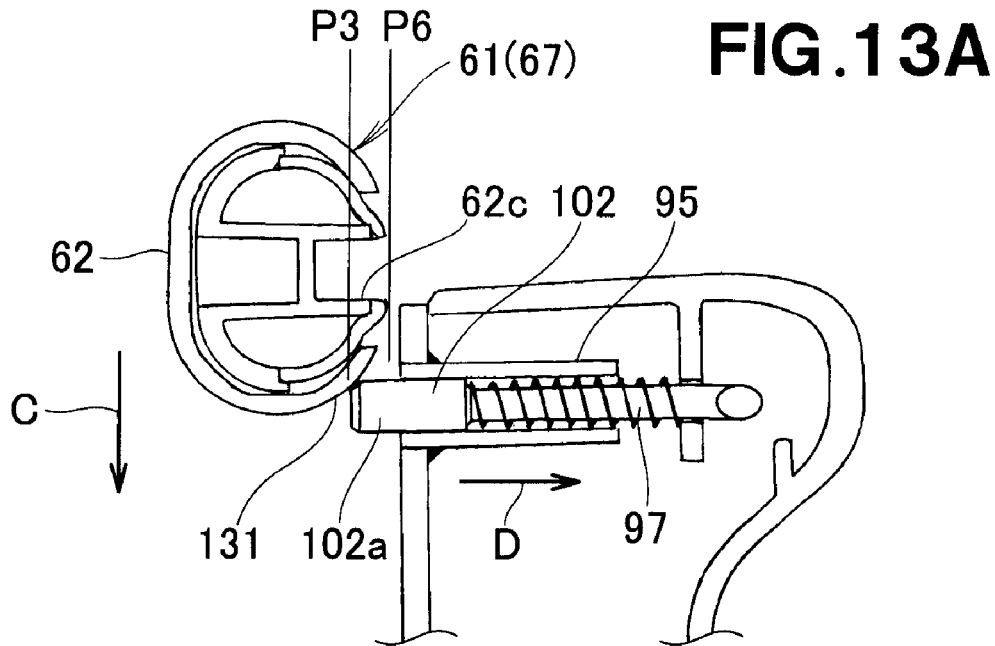
FIG. 13 is explanatory of an example manner in which a left handle section is retained in the deployed position.

Thus, as shown in FIG. 13A, the left base section 62 of the handle body 61 reaches a point above the left lock pin 102. Then, as the human operator further continues to pivot the handle body 61 toward the deployed position P2 (see FIG. 12B), the left base section 62 of the handle body 61 descends toward the left lock pin 102 as indicated by arrow C in FIG. 13A.

Thus, the curved portion 131 of the left base section 62 comes to abut against the distal end 102a of the left lock pin 102, so that the curved portion 131 presses the left lock pin 102 against the biasing force of the left return spring 97. By being pressed by the curved portion 131 like this, the left lock pin 102 moves from the left lock position P3 to the left lock cancellation position P6 as indicated by arrow D.

Figure 13B:
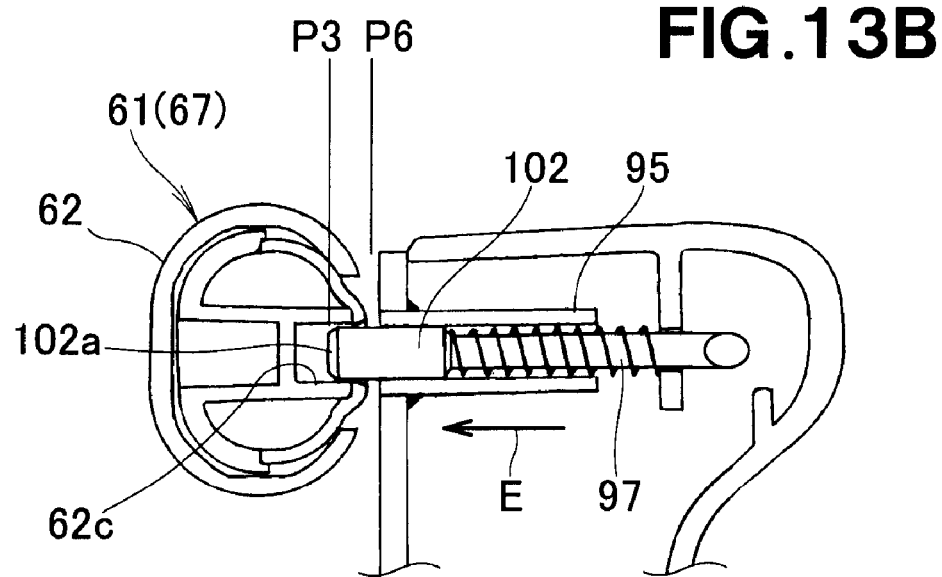

Then, as shown in FIG. 13B, the left base section 62 of the handle body 61 takes the deployed position P2, where the left engaging hole 62c is located coaxially with the left lock pin 102. Also, the left lock pin 102 projects to the left lock position P3, as indicated by arrow E, by the biasing force of the left return spring 97, so that the left lock pin 102 is inserted into the left engaging hole 62c and thus the engaging hole 62c is engaged by the inserted left lock pin 102.

Thus, the left handle section 67 (namely, handle body 61) is positioned in the deployed position P2, as shown in FIG. 14. Then, the left handle section 67 can be retained in the deployed position P2 with the left lock pin 102 automatically engaged in the left engaging hole 62c.

It should be appreciated that the right handle section 68 and other elements related to the right handle section 68 behave similarly to the left handle section 67 and other elements related to the left handle section 67. In the aforementioned manner, the handle body 61 can be readily extended from the stored position P1 to the deployed position P2 with reduced labor by the human operator.

Next, with reference to FIG. 15, a description will be given about an example manner in which the working machine 10 is towed with the handle body 61.

Figure 15A:
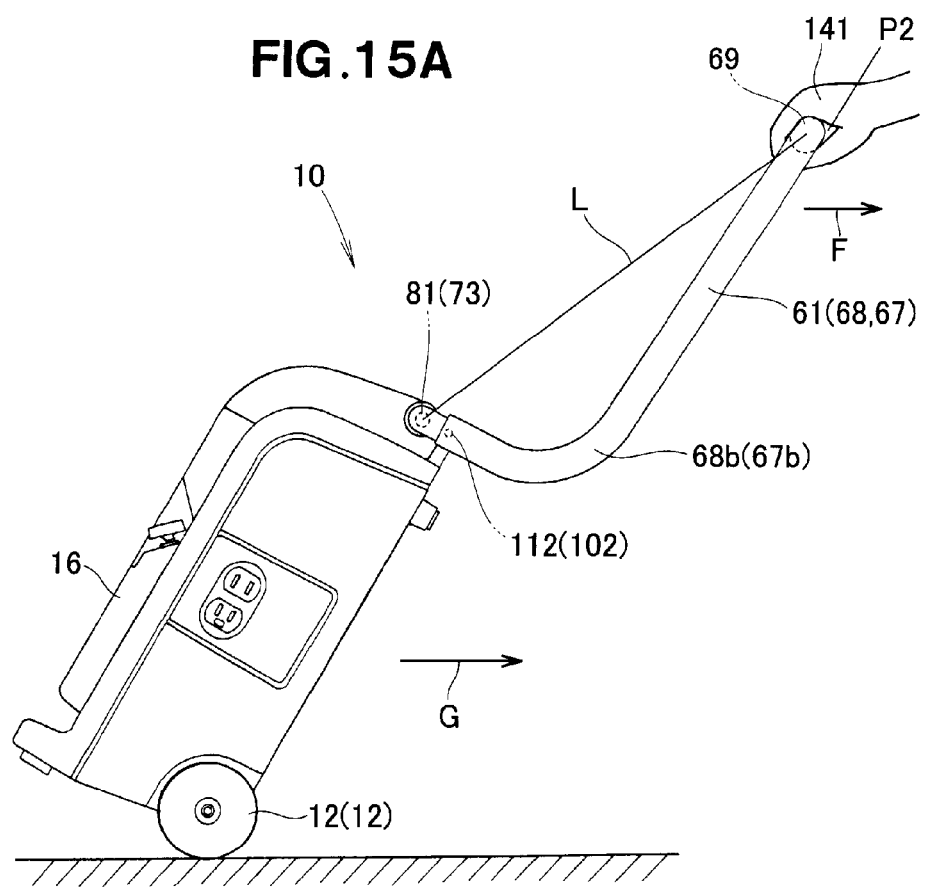
FIG. 15 is a view explanatory of an example manner in which the working machine is towed with the handle body.

As shown in FIG. 15A, the human operator first positions the handle body 61 in the deployed position P2, then holds the handle grip 69 of the handle body 61 with a hand 141 and then pulls the handle grip 69, as indicated by arrow F. In this way, the working machine body 11 can be towed as indicated by arrow G.

Because the left and right handle sections 67 and 68 of the handle body 61 are each formed in an L shape as viewed in side elevation, there can be secured a greater length L between the left and right support shafts 73 and 81 and the handle grip 69 than in the conventionally-known working machines where the left and right handle sections are each formed in a straight shape. Thus, when the handle body 61 is in the deployed position P2, the handle grip 69 can be positioned at an easy-to-grip position sufficiently remote from the case 16. Therefore, usability or operability of the handle body 61 and hence the working machine can be enhanced.

Figure 15B:
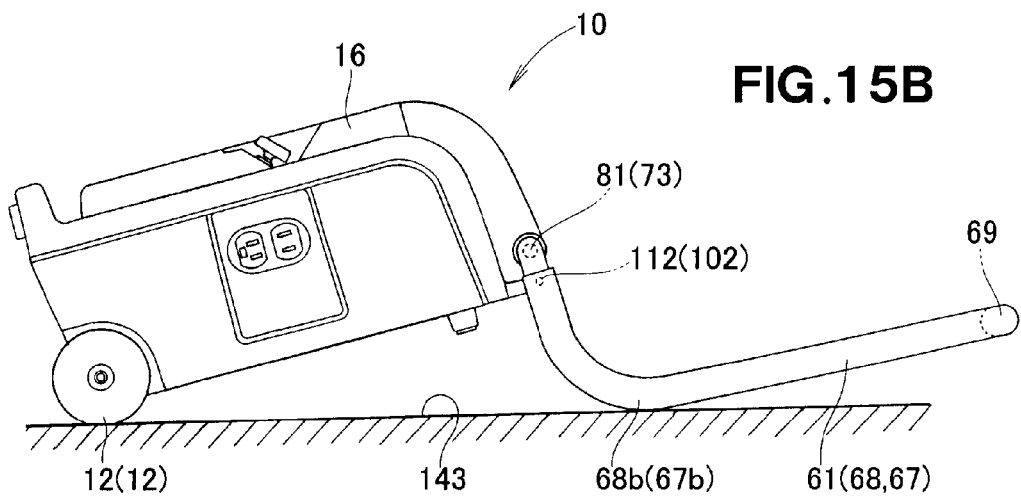

Further, because left and right handle sections 67 and 68 of the handle body 61 are each formed in an L shape as viewed in side elevation as noted above, intermediate corner portions 67*b* and 68*b* of the left and right handle sections 67 and 68 project generally in the towing direction beyond the left and right support shafts 73 and 81 when the handle body 61 is retained in the deployed position P2, as shown in FIGS. 15A and 15B.

Thus, if the working machine 10 has toppled down as a result of the human operator accidentally taking the hand 141 off the handle grip 69 during towing of the working machine 10, the corner portions 67*b* and 68*b* can abut against a road surface (ground surface) 143. Thus, it is possible to prevent the left and right support shafts 73 and 81 from undesirably abutting against the road surface 143 to be damaged.

Next, with reference to FIGS. 16 and 17, a description will be given about an example manner in which the handle body 61 of the working machine 10 is retracted to the stored position P1.

Figure 16A:
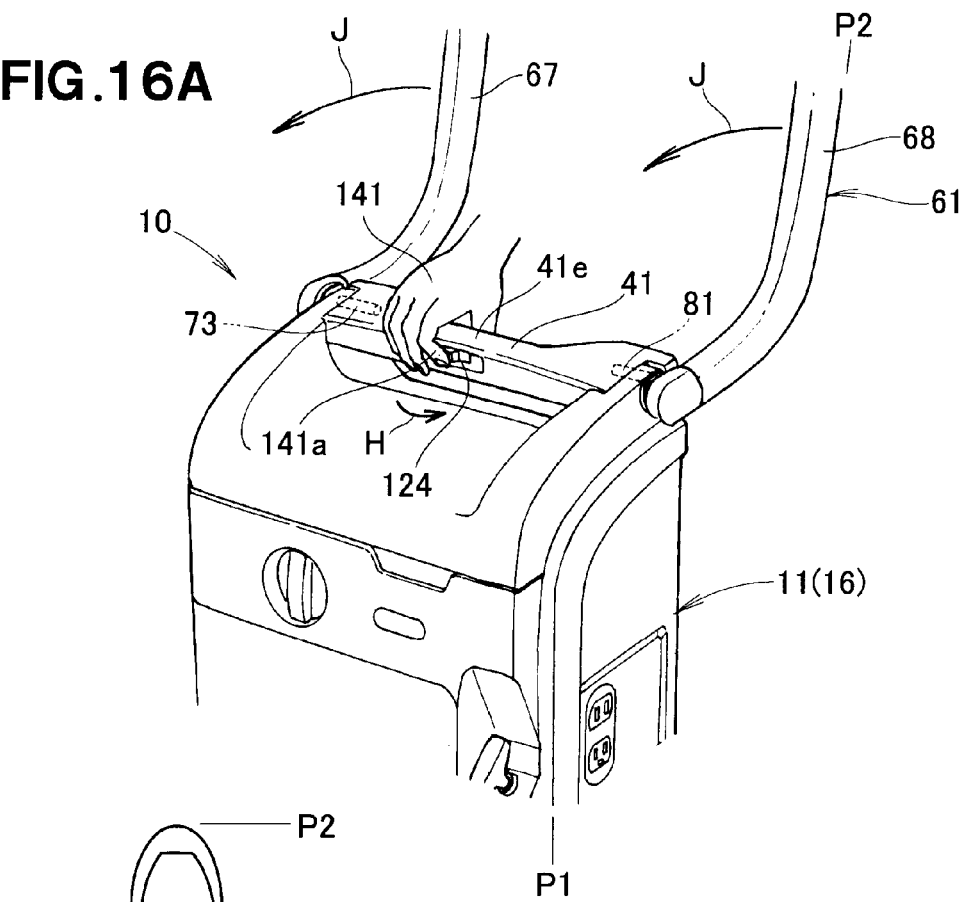
FIG. 16 is a view explanatory of an example manner in which the retained state of the left handle section is cancelled.

As shown in FIG. 16A, the human operator first holds the middle portion 41*e* of the grip 41 with the hand 141 and then uses his or her fingers to move the single operating knob 124 from the knob lock position P5 to the knob lock cancellation position P7 (FIG. 16B) as indicated by arrow H. By the human operator holding the machine-carrying grip 41, the working machine body 11 can be held stably, so that the human operator can operate the operating knob 124 with ease.

Figure 16B:
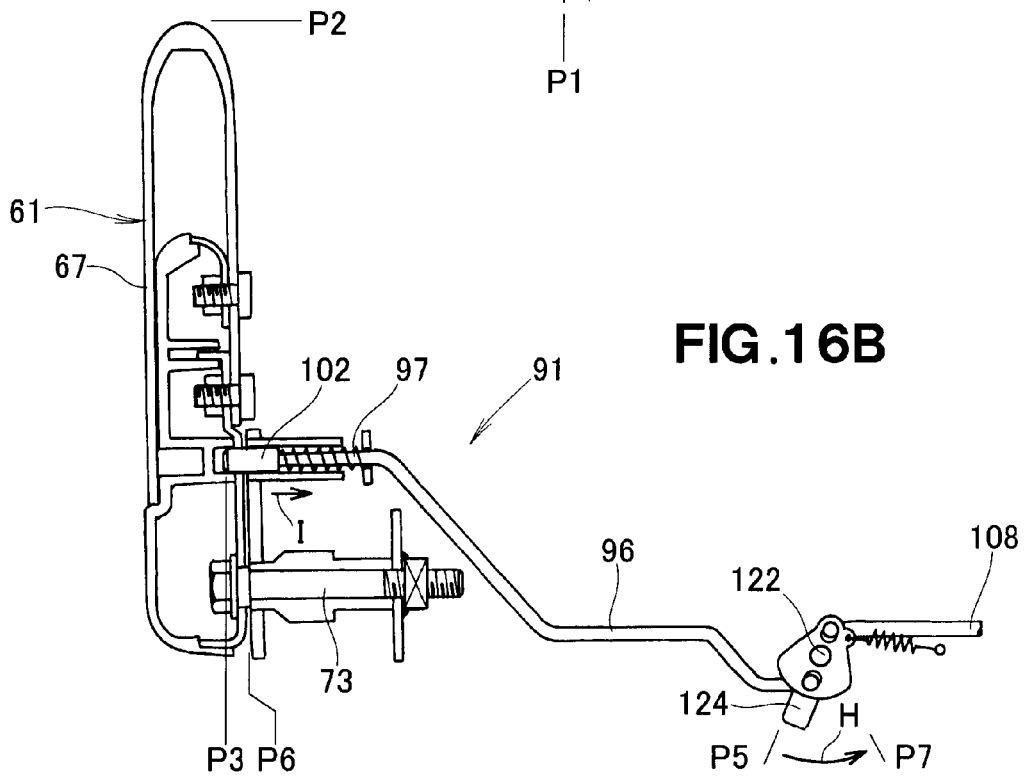
Figure 17:
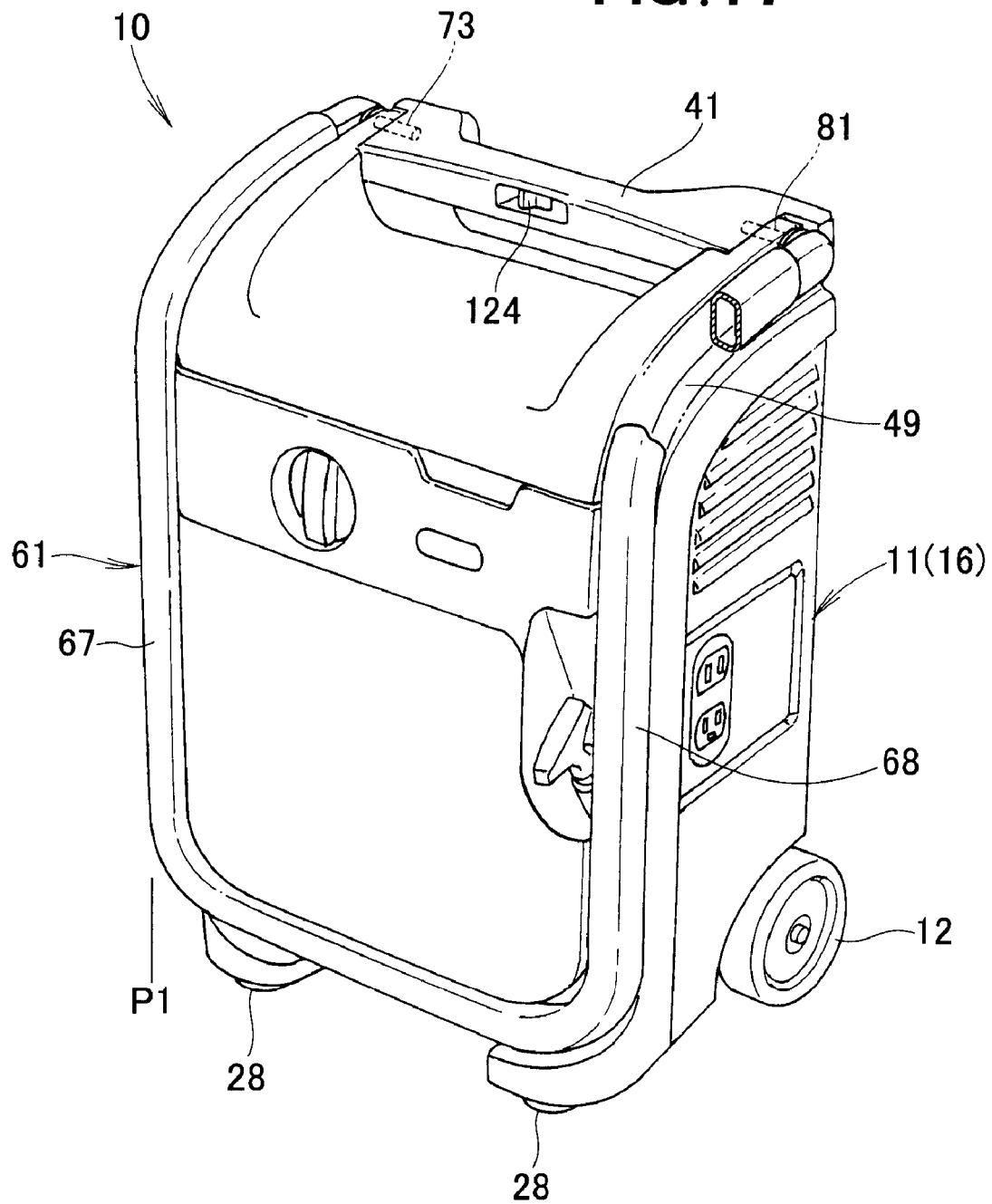
FIG. 17 is a view showing the handle body collapsed to the stored position.

Then, by the human operator moving the operating knob 124 to the knob lock cancellation position P7 as noted above, the left lock pin 102 moves from the left lock position P3 to the left lock cancellation position P6 against the biasing force of the left return spring 97 as indicated by arrow I in FIG. 16B, so that the retention, by the left lock section 91, of the left handle section 67 is canceled. At the same time, the retention, by the right lock section 92, of the right handle section 68 is canceled.

Because the retained state of the left and right handle sections 67 and 68 (see FIG. 16A for the right handle section 68) can be canceled through operation of only the single operating knob 124; thus, the retained state of the handle body 61 can be cancelled with ease.

Referring back to FIG. 16A, with the retained state of the handle body 61 cancelled in the aforementioned manner, the human operator pivotally pivots the handle body 61 from the deployed position P1 toward the stored position about the left and right support shafts 73 and 81 as indicated by arrow J. Then, the handle body 61 pivots to the stored position P1 about the left and right support shafts 73 and 81 and is stored into the storing recessed portion 49.

As described above in relation to FIGS. 16 and 17, the locked state of the handle body 61 can be readily canceled by the human operator merely holding the machine-carrying grip 41 with the hand 141 and operating the single operating knob 124. Further, because the working machine body 11 can be held stably by the human operator holding the machine-carrying grip 41 with the hand 141, the operating knob 124 can be operated with ease. In this way, the handle body 61 can be retracted or collapsed to the stored position P1 with reduced labor by the human operator.

In order to secure sufficient operability of the operating knob 124, it is important to positionally stabilize the working machine 10, especially where the working machine 10 is of a compact portable/towing type having superior portability (more specifically, movability responsive to towing force and transportability achieved by being carried in the vehicle). Thus, the instant embodiment is constructed to allow the human operator to readily operate the operating knob 124 of the working machine 10 of the compact portable/towing type having superior portability by holding the machine-carrying grip 41 with the hand 141 to thereby stably hold the working machine 10. As a result, the handle body 61 of the working machine 10 of the compact portable/towing type can be readily retracted to the stored position P1 with reduced labor by the human operator.

The following describe an example manner in which the working machine 10 is put into the luggage compartment of the vehicle.

As shown in FIG. 18A, the human operator holds the carrying grip 41 with the hand 141 to lift up the working machine 10 as indicated by arrow K and puts the working machine 10 into the luggage compartment 146 of the vehicle 145 (FIG. 18B).

Then, as shown in FIG. 18B, the working machine 10 is inclined about 90 degrees (i.e., turned down), and the left and right carrying foot portions 29 and the left and right wheels 12 are placed into contact with the floor surface of the luggage compartment 146 of the vehicle 145. In this way, the vertically-elongated working machine 10 can be put into and retained in the luggage compartment 146 in a stable condition.

Note that, when the working machine 10 is carried in the vehicle 145, the working machine 10 may undesirably move (positionally shift) from its original vehicle-mounted position due to vibration and acceleration/deceleration occurring during travel of the vehicle.

However, in the instant embodiment, the to-be-protected members, such as the cassette gas canister 37 (FIG. 18A), operation start/stop switch 31, starter knob 32, exhaust outlet 34 (FIG. 4) and electric outlets 36, are protected with the handle body 61. Thus, even when the working machine 10 has undesirably moved (shifted) from the original vehicle-mounted position, the instant embodiment can reliably prevent the to-be-protected members, such as the cassette gas canister 37, from being interfered with by other vehicle-mounted luggage and/or projecting members of the vehicle 145.

It should be appreciated that the handle structure 13 of the present invention is never limited to the above-described embodiment and may be changed or modified as appropriate without departing from the basic principles of the present invention.

For example, whereas the working machine 10 to which is applied the present invention has been described as being a portable/towing-type power generator, the present invention is not so limited and may be applied to other working machines, such as power spray pumps.

Further, whereas the embodiment has been described above in relation to the case where the operation start/stop switch 31, starter knob 32, exhaust outlet 34, electric outlets 36 and cassette gas canister 37 are the to-be-protected members, the to-be-protected members may include, in addition to the aforementioned, any other member, such as an air inlet.

Furthermore, whereas the embodiment has been described above as using a gas engine as the engine 18, the engine 18 may be another type of engine, such as a gasoline engine. In this case, a fuel tank containing gasoline is used in place of the cassette gas canister 37, and such a fuel tank may be protected as a to-be-protected member.

Furthermore, the left and right wheels 12, handle structure 13, case 16, bottom section 21, front wall section 22, left and right wall sections 24 and 25, top section 26, operation start/stop switch 31, starter knob 32, exhaust outlet 34, electric outlet 36, cassette gas canister 37, handle body 61, left and right support shafts 73 and 81, etc. are not limited to the shapes shown and described above and may be modified in shape as appropriate.

The basic principles of the present invention are suited for application to handle structures having a handle structure movable between a stored position where it is stored in a working machine body and a deployed position extended from the machine body.

What is claimed is:

1. A working machine comprising:

towing wheels mounted on a machine body formed in a substantially rectangular parallelepiped shape and having a top section, a bottom section, and opposing first and second wall sections between the top and bottom sections, wherein the towing wheels are mounted near an intersection of the bottom section and the second wall section; and a towing handle mounted on the top section of the machine body nearer the second wall section than the first wall section in such a manner that the handle is movable between a stored position where the handle is stored in the machine body and a deployed position where the handle is deployed from the stored position, the machine body being towable with the handle in the deployed position, the handle in the stored position being disposed along outer peripheral portions of the top section and the first wall section of the machine body located adjoining the top section, the first wall section having an upper end connecting with an end of the top section that extends generally in a machine-towing direction, wherein to-be-protected members are provided on the top section and the first wall section, the handle in the stored position projecting outwardly beyond the top section and the first wall section.

2. The working machine of claim 1, wherein the handle in the stored position is disposed along outer peripheral portions of opposed side wall sections of the machine body located adjoining the first and second wall sections, and the handle in the stored position projects outwardly beyond the opposed side wall sections.

3. The working machine of claim 1, wherein the wheels are mounted on an end portion, in the machine-towing direction, of the bottom section of the machine body, and the handle is pivotably mounted on an end portion, in the machine-towing direction, of the top section.

4. The working machine of claim 1, wherein the handle is formed in a substantially L shape, as viewed in side elevation, so that the handle has an intermediate corner portion, and wherein, when the handle is in the deployed position, the intermediate corner portion projects generally in the machine-towing direction beyond a support shaft via which the handle is pivotably mounted on the machine body.

* * * * *